(12) United States Patent
Krohlow et al.

(10) Patent No.: US 11,892,373 B2
(45) Date of Patent: Feb. 6, 2024

(54) HUB CONNECTION FOR PIPELINE INSPECTION DEVICE

(71) Applicant: MILWAUKEE ELECTRIC TOOL CORPORATION, Brookfield, WI (US)

(72) Inventors: Samuel J. Krohlow, Milwaukee, WI (US); Christopher J. Turner, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/572,251

(22) Filed: Jan. 10, 2022

(65) Prior Publication Data

US 2022/0128424 A1 Apr. 28, 2022

Related U.S. Application Data

(63) Continuation of application No. 16/407,825, filed on May 9, 2019, now Pat. No. 11,248,982.

(Continued)

(51) Int. Cl.
*G01M 3/00* (2006.01)
*G01N 21/954* (2006.01)
(Continued)

(52) U.S. Cl.
CPC ............. *G01M 3/005* (2013.01); *F16L 55/30* (2013.01); *G01N 21/954* (2013.01); *F16L 2101/30* (2013.01)

(58) Field of Classification Search
CPC ........ G01D 11/30; H04N 7/183; H04N 7/185; H04N 2005/2255; H04N 5/2253;
(Continued)

(56) References Cited

U.S. PATENT DOCUMENTS 2,301,104 A 11/1942 Lloyd
D196,100 S 8/1963 O'Neill
(Continued)

FOREIGN PATENT DOCUMENTS

DE 202005002976 U1 8/2005
EP 0987541 A1 3/2000
(Continued)

OTHER PUBLICATIONS

International Search Report and Written Opinion for Application No. PCT/US2019/031516 dated Aug. 26, 2019 (13 pages).

(Continued)

*Primary Examiner* — John Fitzgerald
*Assistant Examiner* — Truong D Phan
(74) *Attorney, Agent, or Firm* — Michael Best & Friedrich LLP

(57) ABSTRACT

A pipeline inspection device, including a rotatable drum housing a cable, where the cable is extendable into a pipe, a camera positioned on an end of the cable, and a hub housing electrical components of the pipeline inspection device and including a battery housing. A stand includes a mounting assembly having a first portion rotatably supporting the drum and a second portion supporting the hub within an interior of the drum, the second portion including a core, where the hub is removably coupled to the mounting assembly via the core. The hub is removably coupled to the mounting assembly by a first engagement member on the hub and a second engagement member on the core.

17 Claims, 28 Drawing Sheets

Related U.S. Application Data

(60) Provisional application No. 62/668,873, filed on May 9, 2018.

(51) Int. Cl.
    *F16L 55/30*     (2006.01)
    *F16L 101/30*     (2006.01)

(58) Field of Classification Search
    CPC .... G01N 21/954; F16L 2101/30; F16L 55/30; G01M 3/005; B65H 75/403; B65H 75/4471; B65H 75/4484; B65H 75/364; B08B 9/043; E03F 7/12
    See application file for complete search history.

(56) References Cited

U.S. PATENT DOCUMENTS

| | | |
|---|---|---|
| 3,400,230 A | 9/1968 | Becker et al. |
| 3,976,260 A | 8/1976 | Irik |
| D257,576 S | 12/1980 | Bobrovniczky |
| 4,255,762 A | 3/1981 | Takeyasu et al. |
| D260,985 S | 9/1981 | Moylan |
| 4,576,097 A | 3/1986 | Foster |
| 4,611,360 A | 9/1986 | Irwin |
| D286,134 S | 10/1986 | Schwartz |
| D286,503 S | 11/1986 | Bobrovniczky |
| 4,725,883 A | 2/1988 | Clark, Jr. et al. |
| 4,913,558 A | 4/1990 | Wettervik et al. |
| 4,974,168 A | 11/1990 | Marx |
| 4,987,584 A | 1/1991 | Doenges |
| 5,014,925 A | 5/1991 | Cump |
| 5,309,595 A | 5/1994 | Salecker et al. |
| 5,649,674 A | 7/1997 | Ciekler |
| 5,754,220 A | 5/1998 | Smalser, Sr. |
| 6,457,669 B1 | 10/2002 | Chuang |
| 6,545,704 B1 | 4/2003 | Olsson et al. |
| D475,277 S | 6/2003 | Wu |
| 6,697,102 B1 | 2/2004 | Olsson et al. |
| 6,831,679 B1 | 12/2004 | Olsson et al. |
| 6,846,285 B2 | 1/2005 | Hasegawa et al. |
| 6,862,945 B2 | 3/2005 | Chapman et al. |
| 6,889,701 B2 | 5/2005 | Kovacik et al. |
| 6,908,310 B1 | 6/2005 | Olsson et al. |
| 6,931,149 B2 | 8/2005 | Hagene et al. |
| 6,958,767 B2 | 10/2005 | Olsson et al. |
| 7,009,399 B2 | 3/2006 | Olsson et al. |
| 7,044,623 B2 | 5/2006 | Olsson et al. |
| 7,104,951 B2 | 9/2006 | Hasegawa et al. |
| 7,136,765 B2 | 11/2006 | Maier et al. |
| 7,164,476 B2 | 1/2007 | Shima et al. |
| 7,221,136 B2 | 5/2007 | Olsson et al. |
| 7,298,126 B1 | 11/2007 | Olsson et al. |
| 7,332,901 B2 | 2/2008 | Olsson et al. |
| 7,336,078 B1 | 2/2008 | Merewether et al. |
| 7,359,611 B1 | 4/2008 | Kaplan |
| 7,443,154 B1 | 10/2008 | Merewether et al. |
| D580,857 S | 11/2008 | Matthew et al. |
| 7,498,797 B1 | 3/2009 | Olsson et al. |
| 7,498,816 B1 | 3/2009 | Olsson et al. |
| 7,518,374 B1 | 4/2009 | Olsson et al. |
| 7,551,197 B2 | 6/2009 | Penza et al. |
| 7,557,559 B1 | 7/2009 | Olsson et al. |
| D604,244 S | 11/2009 | Kovacik et al. |
| 7,619,516 B2 | 11/2009 | Olsson et al. |
| 7,676,879 B1 | 3/2010 | Rutenberg et al. |
| 7,715,701 B2 | 5/2010 | Lange |
| 7,733,077 B1 | 6/2010 | Merewether et al. |
| 7,741,848 B1 | 6/2010 | Olsson et al. |
| 7,825,647 B2 | 11/2010 | Olsson et al. |
| 7,830,149 B1 | 11/2010 | Olsson et al. |
| 7,863,885 B1 | 1/2011 | Olsson et al. |
| D636,253 S | 4/2011 | Hatcher et al. |
| 7,948,236 B1 | 5/2011 | Olsson et al. |
| 7,990,151 B2 | 8/2011 | Olsson et al. |
| 8,013,610 B1 | 9/2011 | Merewether et al. |
| 8,033,677 B1 | 10/2011 | Olsson et al. |
| 8,035,390 B2 | 10/2011 | Olsson et al. |
| 8,074,916 B2 | 12/2011 | Penumatcha et al. |
| 8,106,660 B1 | 1/2012 | Merewether et al. |
| 8,167,468 B1 | 5/2012 | Olsson et al. |
| 8,172,434 B1 | 5/2012 | Olsson |
| 8,176,593 B2 | 5/2012 | Gress et al. |
| 8,203,343 B1 | 6/2012 | Olsson et al. |
| 8,248,056 B1 | 8/2012 | Olsson et al. |
| 8,264,226 B1 | 9/2012 | Olsson et al. |
| 8,279,278 B2 | 10/2012 | Park et al. |
| 8,289,385 B2 | 10/2012 | Olsson et al. |
| 8,395,661 B1 | 3/2013 | Olsson et al. |
| 8,400,154 B1 | 3/2013 | Olsson et al. |
| 8,413,347 B2 | 4/2013 | Gress et al. |
| 8,540,429 B1 | 9/2013 | Olsson et al. |
| 8,547,428 B1 | 10/2013 | Olsson et al. |
| 8,564,295 B2 | 10/2013 | Olsson et al. |
| 8,587,648 B2 | 11/2013 | Olsson et al. |
| 8,616,725 B2 | 12/2013 | Olsson et al. |
| 8,616,734 B2 | 12/2013 | Olsson |
| 8,632,230 B2 | 1/2014 | Olsson et al. |
| 8,635,043 B1 | 1/2014 | Olsson et al. |
| 8,717,028 B1 | 5/2014 | Merewether et al. |
| 8,773,133 B1 | 7/2014 | Olsson et al. |
| 8,864,326 B2 | 10/2014 | Armer et al. |
| 8,908,027 B2 | 12/2014 | Kleyn et al. |
| 8,931,131 B1 | 1/2015 | Feduke |
| 8,970,211 B1 | 3/2015 | Olsson et al. |
| 8,984,698 B1 | 3/2015 | Olsson |
| 9,019,364 B2 | 4/2015 | Brignac et al. |
| 9,041,794 B1 | 5/2015 | Olsson et al. |
| 9,057,754 B2 | 6/2015 | Olsson et al. |
| 9,080,992 B2 | 7/2015 | Olsson et al. |
| 9,081,109 B1 | 7/2015 | Olsson et al. |
| 9,082,269 B2 | 7/2015 | Olsson et al. |
| 9,091,416 B1 | 7/2015 | Olsson et al. |
| 9,151,484 B1 | 7/2015 | Olsson et al. |
| 9,134,255 B1 | 9/2015 | Olsson et al. |
| 9,134,817 B2 | 9/2015 | Olsson |
| 9,143,740 B2 | 9/2015 | Hansen et al. |
| 9,207,350 B2 | 12/2015 | Olsson et al. |
| 9,222,809 B1 | 12/2015 | Olsson et al. |
| 9,234,812 B2 | 1/2016 | Krywyj |
| 9,239,512 B2 | 1/2016 | Foss et al. |
| 9,277,105 B2 | 3/2016 | Olsson et al. |
| 9,285,109 B1 | 3/2016 | Olsson et al. |
| 9,304,055 B2 | 4/2016 | Hansen et al. |
| 9,316,387 B1 | 4/2016 | Olsson et al. |
| D755,726 S | 5/2016 | Michas |
| 9,341,740 B1 | 5/2016 | Olsson et al. |
| 9,372,117 B2 | 6/2016 | Olsson et al. |
| 9,388,973 B1 | 7/2016 | Olsson et al. |
| 9,411,066 B1 | 8/2016 | Olsson et al. |
| 9,411,067 B2 | 8/2016 | Olsson et al. |
| 9,416,957 B2 | 8/2016 | Olsson et al. |
| 9,429,301 B2 | 8/2016 | Olsson et al. |
| 9,435,907 B2 | 9/2016 | Olsson et al. |
| 9,448,376 B2 | 9/2016 | Chapman et al. |
| 9,465,129 B1 | 10/2016 | Olsson et al. |
| 9,468,954 B1 | 10/2016 | Olsson et al. |
| 9,477,147 B2 | 10/2016 | Chapman et al. |
| 9,488,747 B2 | 11/2016 | Olsson et al. |
| 9,494,706 B2 | 11/2016 | Olsson et al. |
| 9,506,628 B1 | 11/2016 | Merewether et al. |
| 9,512,988 B2 | 12/2016 | Olsson et al. |
| 9,521,303 B2 | 12/2016 | Olsson et al. |
| 9,523,788 B1 | 12/2016 | Olsson et al. |
| 9,571,326 B2 | 2/2017 | Bench et al. |
| 9,574,760 B1 | 2/2017 | Olsson et al. |
| 9,599,740 B2 | 3/2017 | Olsson |
| 9,625,602 B2 | 4/2017 | Olsson |
| 9,632,202 B2 | 4/2017 | Olsson et al. |
| 9,634,878 B1 | 4/2017 | Bench et al. |
| 9,638,824 B2 | 5/2017 | Olsson et al. |
| 9,684,090 B1 | 6/2017 | Olsson et al. |
| 9,695,008 B2 | 7/2017 | Thakare et al. |
| 9,696,447 B1 | 7/2017 | Olsson et al. |

(56) References Cited

U.S. PATENT DOCUMENTS

| | | |
|---|---|---|
| 9,696,448 B2 | 7/2017 | Olsson et al. |
| 9,703,002 B1 | 7/2017 | Olsson et al. |
| 9,746,170 B1 | 8/2017 | Armer et al. |
| 9,746,572 B2 | 8/2017 | Olsson et al. |
| 9,746,573 B1 | 8/2017 | Olsson et al. |
| 9,769,366 B2 | 9/2017 | Olsson et al. |
| 9,784,837 B1 | 10/2017 | Olsson et al. |
| 9,791,382 B2 | 10/2017 | Olsson et al. |
| 9,798,033 B2 | 10/2017 | Olsson et al. |
| 9,824,433 B2 | 11/2017 | Olsson et al. |
| 9,829,783 B1 | 11/2017 | Chapman et al. |
| 9,835,564 B2 | 12/2017 | Olsson et al. |
| 9,841,503 B2 | 12/2017 | Olsson et al. |
| 9,863,590 B2 | 1/2018 | Olsson et al. |
| 9,880,309 B2 | 1/2018 | Merewether et al. |
| 9,891,337 B2 | 2/2018 | Olsson et al. |
| 9,924,139 B2 | 3/2018 | Olsson et al. |
| 9,927,368 B1 | 3/2018 | Olsson et al. |
| 9,927,545 B2 | 3/2018 | Olsson et al. |
| 9,927,546 B2 | 3/2018 | Olsson et al. |
| 9,928,613 B2 | 3/2018 | Olsson et al. |
| D815,049 S | 4/2018 | Temblador et al. |
| 9,945,976 B2 | 4/2018 | Olsson et al. |
| 9,989,662 B1 | 6/2018 | Olsson et al. |
| 10,001,425 B1 | 6/2018 | Olsson et al. |
| 10,009,519 B2 | 6/2018 | Olsson et al. |
| 10,009,582 B2 | 6/2018 | Olsson et al. |
| 10,024,366 B2 | 7/2018 | Kleyn et al. |
| 10,024,994 B1 | 7/2018 | Cox et al. |
| 10,031,253 B2 | 7/2018 | Olsson et al. |
| D836,560 S | 12/2018 | Temblador et al. |
| 10,364,125 B2 | 7/2019 | Blair et al. |
| 10,434,547 B2 | 10/2019 | Turner et al. |
| 11,052,809 B2 | 7/2021 | Weber et al. |
| 11,059,695 B2 | 7/2021 | Zahnd et al. |
| 11,248,982 B2 | 2/2022 | Krohlow et al. |
| 2002/0032365 A1 | 3/2002 | Hasegawa et al. |
| 2002/0113870 A1 | 8/2002 | Mueckl et al. |
| 2002/0154811 A1 | 10/2002 | Katsuta et al. |
| 2003/0052967 A1 | 3/2003 | Brunton |
| 2004/0054259 A1 | 3/2004 | Hasegawa et al. |
| 2005/0193509 A1 | 9/2005 | Rutkowski et al. |
| 2006/0195994 A1 | 9/2006 | Hung |
| 2007/0132842 A1 | 6/2007 | Morris |
| 2007/0297778 A1 | 12/2007 | Lange |
| 2008/0098544 A1 | 5/2008 | Rutkowski et al. |
| 2008/0229527 A1 | 9/2008 | Berry |
| 2010/0127922 A1 | 5/2010 | Sooy |
| 2010/0208056 A1* | 8/2010 | Olsson .................. H04N 23/54 348/84 |
| 2011/0098941 A1 | 4/2011 | Duckworth et al. |
| 2012/0069172 A1 | 3/2012 | Hudritsch |
| 2012/0147173 A1 | 6/2012 | Lynch |
| 2012/0203501 A1 | 8/2012 | Gress et al. |
| 2012/0206501 A1 | 8/2012 | Gress et al. |
| 2012/0211580 A1 | 8/2012 | Kleyn et al. |
| 2012/0242341 A1 | 9/2012 | Olsson et al. |
| 2013/0164567 A1 | 6/2013 | Olsson et al. |
| 2013/0214786 A1 | 8/2013 | Hansen et al. |
| 2013/0218485 A1 | 8/2013 | Hansen et al. |
| 2013/0235271 A1 | 9/2013 | Kasuga et al. |
| 2014/0111376 A1 | 2/2014 | Bench et al. |
| 2014/0152802 A1 | 6/2014 | Olsson et al. |
| 2014/0154535 A1 | 6/2014 | Olsson et al. |
| 2014/0159729 A1 | 6/2014 | Olsson et al. |
| 2014/0167766 A1 | 6/2014 | Olsson et al. |
| 2014/0168407 A1 | 6/2014 | Olsson et al. |
| 2014/0176696 A1 | 6/2014 | Chapman et al. |
| 2014/0204197 A1* | 7/2014 | Olsson .................. H04N 23/66 348/84 |
| 2014/0210989 A1 | 7/2014 | Olsson et al. |
| 2014/0313316 A1 | 10/2014 | Olsson et al. |
| 2014/0313321 A1 | 10/2014 | Olsson et al. |
| 2015/0055005 A1 | 2/2015 | Olsson et al. |
| 2015/0077120 A1 | 3/2015 | Olsson et al. |
| 2015/0101896 A1 | 4/2015 | Kleyn et al. |
| 2015/0263434 A1 | 9/2015 | Bench et al. |
| 2015/0263469 A1 | 9/2015 | Olsson |
| 2015/0350506 A1 | 12/2015 | Olsson et al. |
| 2015/0355363 A1 | 12/2015 | Merewether et al. |
| 2016/0141766 A1 | 5/2016 | Olsson et al. |
| 2016/0173829 A1 | 6/2016 | Olsson et al. |
| 2016/0187522 A1 | 6/2016 | Olsson et al. |
| 2016/0261829 A1 | 9/2016 | Olsson et al. |
| 2016/0373619 A1 | 12/2016 | Olsson et al. |
| 2017/0015490 A1 | 1/2017 | Olsson et al. |
| 2017/0017010 A1 | 1/2017 | Olsson et al. |
| 2017/0023492 A1 | 1/2017 | Olsson et al. |
| 2017/0024872 A1 | 1/2017 | Olsson et al. |
| 2017/0115424 A1 | 4/2017 | Olsson et al. |
| 2017/0128989 A1 | 5/2017 | Olsson et al. |
| 2017/0130950 A1 | 5/2017 | Olsson et al. |
| 2017/0131422 A1 | 5/2017 | Olsson et al. |
| 2017/0131423 A1 | 5/2017 | Olsson et al. |
| 2017/0131424 A1 | 5/2017 | Olsson |
| 2017/0134693 A1 | 5/2017 | Chapman et al. |
| 2017/0160420 A1 | 6/2017 | Olsson et al. |
| 2017/0163940 A1 | 6/2017 | Olsson et al. |
| 2017/0176344 A9 | 6/2017 | Olsson et al. |
| 2017/0191651 A1 | 7/2017 | Merewether et al. |
| 2017/0200352 A1 | 7/2017 | Olsson et al. |
| 2017/0235010 A1 | 8/2017 | Olsson et al. |
| 2017/0261196 A1 | 9/2017 | Chapman et al. |
| 2017/0261630 A1 | 9/2017 | Olsson et al. |
| 2017/0299757 A1 | 10/2017 | Bench et al. |
| 2017/0307670 A1 | 10/2017 | Olsson |
| 2017/0363764 A1 | 12/2017 | Aldridge et al. |
| 2018/0022535 A9 | 1/2018 | Olsson et al. |
| 2018/0038093 A1 | 2/2018 | Olsson et al. |
| 2018/0085696 A1 | 3/2018 | Morris et al. |
| 2018/0128931 A1 | 5/2018 | Olsson et al. |
| 2018/0165924 A9 | 6/2018 | Olsson et al. |
| 2018/0202940 A1 | 7/2018 | Olsson et al. |
| 2018/0231208 A1 | 8/2018 | Chapman et al. |
| 2019/0346330 A1 | 11/2019 | Krohlow et al. |
| 2021/0164601 A1 | 6/2021 | Warren et al. |
| 2021/0250551 A1 | 8/2021 | Turner |
| 2021/0354178 A1 | 11/2021 | Turner et al. |
| 2022/0085592 A1 | 3/2022 | Olsson et al. |
| 2022/0268393 A1 | 8/2022 | Moreau et al. |

FOREIGN PATENT DOCUMENTS

| | | |
|---|---|---|
| EP | 1296131 A2 | 3/2003 |
| EP | 2313211 B1 | 9/2015 |
| JP | 2010096718 A | 4/2010 |
| WO | 0107954 A1 | 2/2001 |
| WO | 2003025536 A2 | 3/2003 |
| WO | 2006078873 A9 | 1/2009 |
| WO | 2012168736 A1 | 12/2012 |
| WO | 2012178205 A2 | 12/2012 |
| WO | 2013074705 A2 | 5/2013 |
| WO | 2013148714 A2 | 10/2013 |
| WO | 2014145778 A1 | 9/2014 |
| WO | 2015031407 A1 | 3/2015 |
| WO | 2016003938 A1 | 1/2016 |
| WO | 2018112476 A1 | 6/2018 |
| WO | 2018129549 A1 | 7/2018 |
| WO | 2018132772 A1 | 7/2018 |

OTHER PUBLICATIONS

Gen-Eye Prism Video Pipe Inspection System, <https://drainbrain.com/products/gen-eye-prism/> website available as early as Dec. 14, 2017.

YouTube, "How to connect mobile devices to Gen-Eye Wi-Fi-Version 2.0," <https://www.youtube.com/watch?v=YKncdIIQLA8> published Sep. 12, 2016.

Extended European Search Report for Application No. 19800876.5 dated Mar. 22, 2022 (7 pages).

\* cited by examiner

HUB CONNECTION FOR PIPELINE INSPECTION DEVICE

CROSS-REFERENCE TO RELATED APPLICATIONS

This application is a continuation of U.S. patent application Ser. No. 16/407,825, filed May 9, 2019, now U.S. Pat. No. 11,248,982, which claims priority to U.S. Provisional Patent Application No. 62/668,873 filed May 9, 2018, the entire contents of which are incorporated by reference herein.

FIELD OF THE INVENTION

The present invention relates to pipeline inspection devices for inspecting sewers, drains, pipes, or other conduits.

BACKGROUND OF THE INVENTION

Pipeline inspection devices can be used to determine the location of obstructions in underground pipes or find damaged areas that affect the integrity of pipe systems. Generally, a pipeline inspection device includes a cable that can be pushed down a length of the pipe. The end of the cable may include an imaging device, such as a video camera, to help identify an obstruction or damage within the pipe. The end of the cable may also include a location device, such as a sonde, to transmit the location of the end of the cable. The location device allows a user to find the end of the cable and dig down towards the pipe at the proper location where the obstruction might be.

SUMMARY OF THE INVENTION

In one embodiment, the invention a pipeline inspection device, including a rotatable drum housing a cable, where the cable is extendable into a pipe, a camera positioned on an end of the cable, and a hub housing electrical components of the pipeline inspection device and including a battery housing. A stand includes a mounting assembly having a first portion rotatably supporting the drum and a second portion supporting the hub within an interior of the drum, the second portion including a core, where the hub is removably coupled to the mounting assembly via the core. The hub is removably coupled to the mounting assembly by a first engagement member on the hub and a second engagement member on the core.

In another embodiments, the invention provides a pipeline inspection device including a rotatable drum housing a cable, where the cable is extendable into a pipe, a camera positioned on an end of the cable, and a hub housing electrical components of the pipeline inspection device and having a battery housing. A stand includes a mounting assembly supporting the drum and the hub, where the drum is rotatably supported on the stand such that the drum is rotatable relative to the stand. A brake assembly is configured to selectively limit a rotational speed of the drum. The brake assembly includes a disc, a brake pad engagable with the disc, and an actuator configured to control a degree of engagement between the disc and the brake.

In yet other embodiments, the invention provides a pipeline inspection system having a pipeline inspection device including a rotatable drum housing a cable, where the cable is extendable into a pipe, a camera positioned on an end of the cable and configured to capture images of the interior of the pipe, a hub housing electrical components of the pipeline inspection device and including a wireless communication module, and a stand including a mounting assembly supporting the drum and the hub. The system further includes a dedicated monitor removably coupled to the stand, where the dedicated monitor is configured to display images captured by the camera, and where the dedicated monitor includes a wireless communication module in wireless communication with the hub. The system further includes a smart device configured to display the images captured by the camera, where the smart device includes a wireless communication module in wireless communication with the hub.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
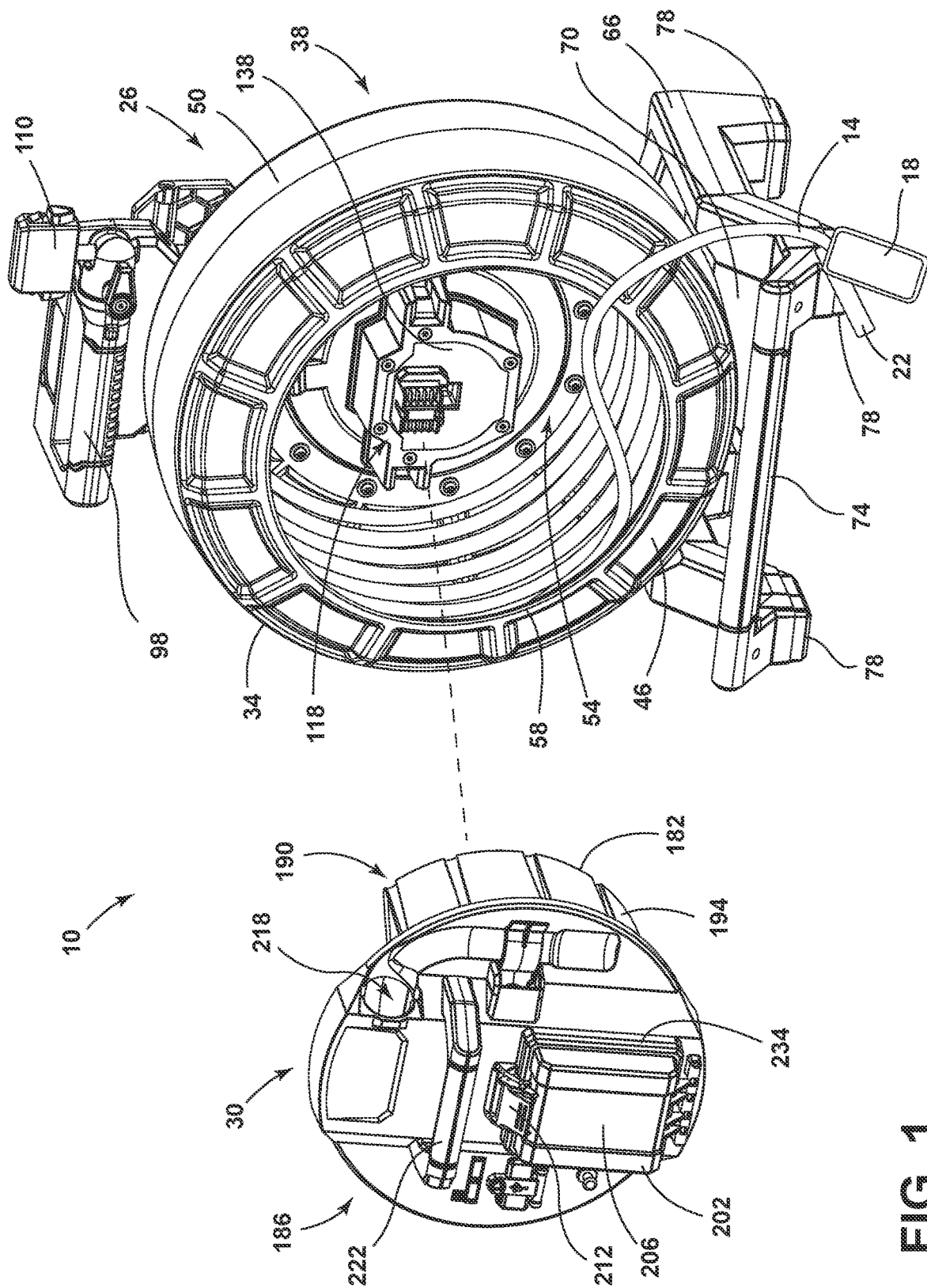
FIG. 1 is a perspective view of a pipeline inspection device according to a first embodiment.

The invention disclosed herein provides a pipeline inspection device 10, as shown in FIG. 1, which can be used to view the interior of the pipe, conduit, etc., such as a buried sewer pipeline to locate obstructions, blockages, and defects in the pipe. Specifically, a user can use the pipeline inspection device 10 to observe the interior of a pipe, often from a distance away from the closest access port to the sewer pipeline. To view the interior of the pipe, a cable 14 is directed down an access port of the pipe and through the sewer pipeline. The cable 14 includes an image capturing device (e.g., a camera 18) and/or a locator device 22 (e.g., a sonde) connected at a distal end thereof, for viewing the interior of the pipeline.

The pipeline inspection device 10 includes a reel 26 for housing the cable 14 and a hub 30 for housing a power source and other electronic components for operating the pipeline inspection device 10. The cable 14 is stored on the reel 26 in a wound configuration, but can be unwound and inserted into a length of a pipe under inspection. The hub 30 provides power to the components of the reel 26 in order to operate the pipeline inspection device 10. As discussed in in greater detail below, the hub 30 is removably coupled to the reel 26. In some embodiments, the hub 30 can be interchangeably used with two or more different reels 26.

Figure 2:
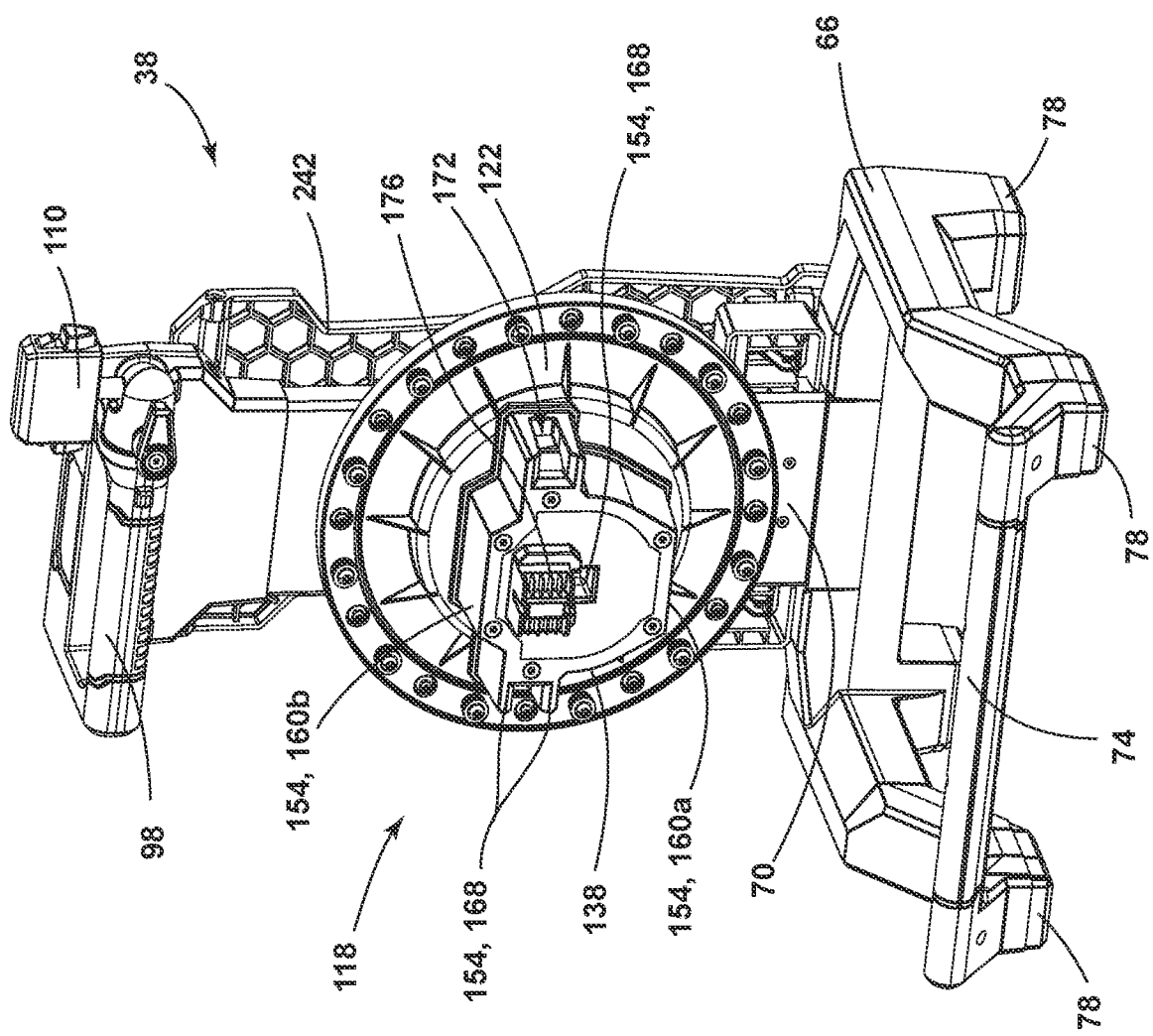
FIG. 2 is a perspective view of a stand of the pipeline inspection device illustrated in FIG. 1.
Figure 3:
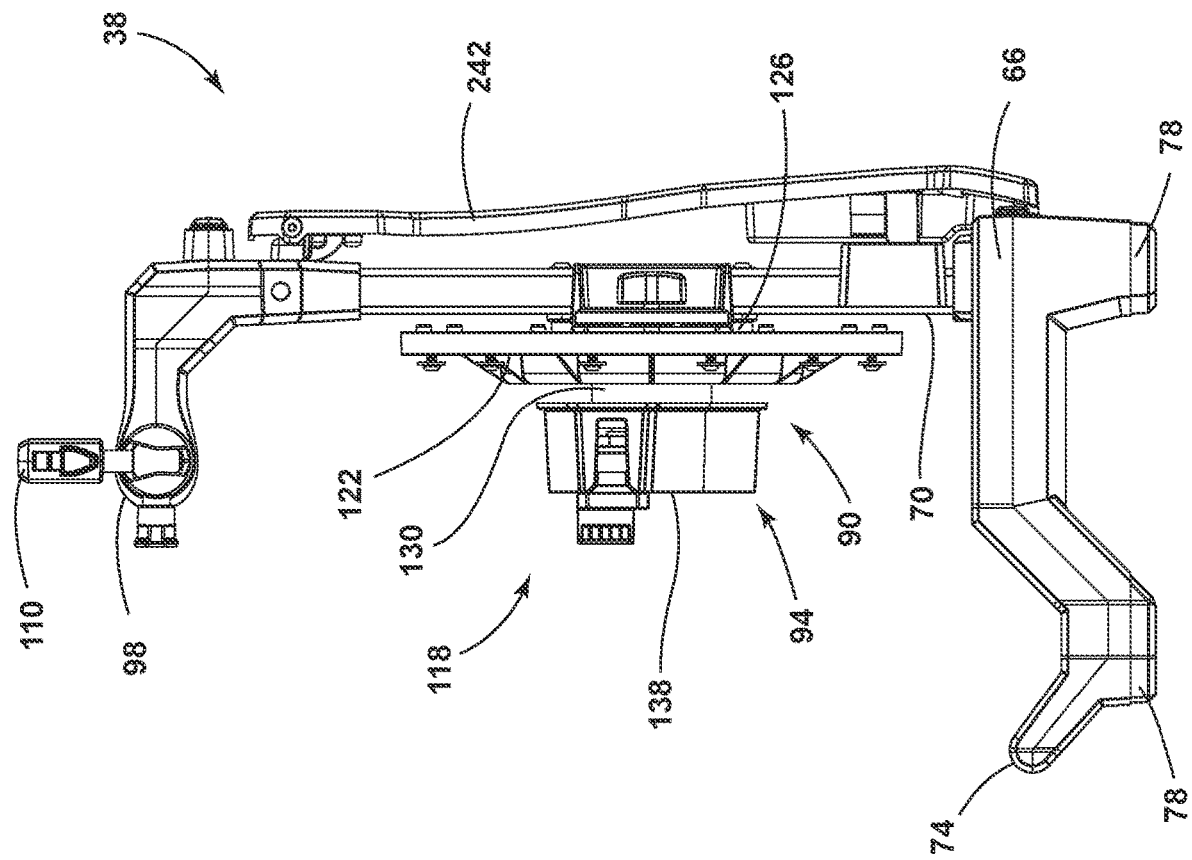
FIG. 3 is a side view of the stand illustrated in FIG. 2.

FIGS. 1-3 illustrate one embodiment of the reel 26. The reel 26 includes a drum 34 for housing the cable 14 and a stand 38 for supporting the drum 34. The drum 34 includes a closed end defined by a back wall, and an open end defined by a front wall 46. A side wall 50 extends around the perimeter of the drum 34 between the front wall 46 and the back wall 42. Together, the back wall 42, the side wall 50, and the front wall 46 define an interior 54 of the drum 34 that houses the cable 14. The front wall 46 includes an opening 58 that provides access to the interior 54 of the drum 34. As will be discussed in further detail below, the hub 30 can be inserted into the drum 34 via the opening 58. Once inside the drum 34, the hub 30 is positioned so that the cable 14 is wound around the hub 30.

The drum 34 rotates about an axis extending through the back wall 42 and the opening 58 of the front wall 46. The cable 14 is stored within the interior 54 and is wound about the axis of the drum 34. The drum 34 can be different sizes in order to accommodate different size or lengths of cables 14. Because the cable 14 is stiff (e.g., a push cable), the cable 14 exerts an outward force towards the walls of the drum 34, and particularly, towards the side wall 50. As the cable 14 is pulled out of the drum 34, the drum 34 can rotate in a first direction about the axis of the drum 34. Conversely, as the cable 14 is pushed back into the drum 34, the drum 34 can rotate in a second direction that is opposite the first direction about the axis of the drum 34. In some embodiments, the drum 34 includes ribs on the inside of the drum 34 to provide for increased frictional engagement with the cable 14. The drum 34 is supported above the ground by the stand 38.

Figure 4B:
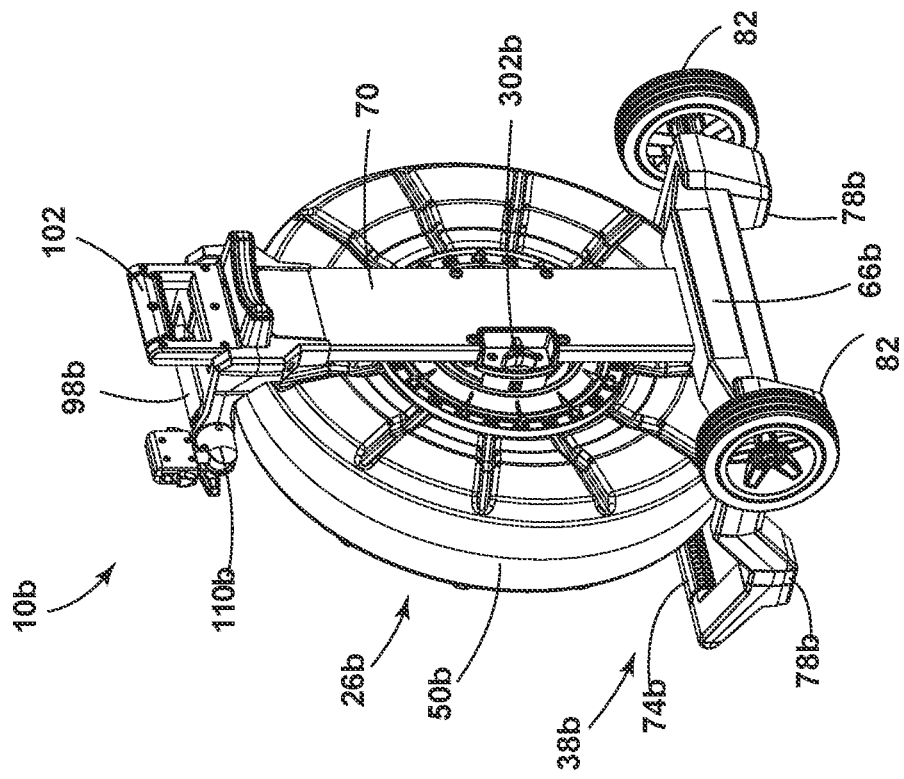
FIG. 4B is a rear perspective view of a pipeline inspection device with another embodiment of a stand.
Figure 4A:
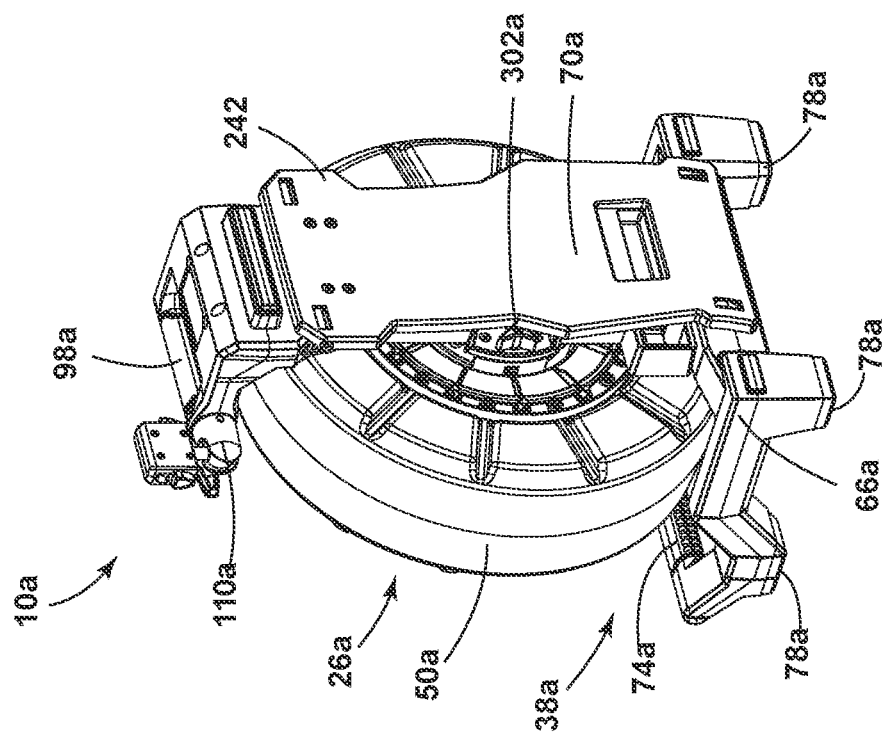
FIG. 4A is a rear perspective view of the pipeline inspection device of FIG. 1.

FIGS. 2-4A illustrate a first embodiment of a pipeline inspection device 10a having a first drum 26a. FIG. 4B illustrates a second embodiment of a pipeline inspection device 10b having a second drum 26b. It should be understood that some of the features of the pipeline inspection devices 10a and 10b are interchangeable from one embodiment to the other. FIGS. 4A and 4B illustrate like components marked with an "a" or "b" adjacent the corresponding element number. The stand 38 includes a base 66 and a center support 70 extending upward from the base 66. In the illustrated embodiment, the base 66 includes one or more feet 78 that contact the ground. In other embodiments, one of more of the feet 78 can be replaced with wheels 82, as shown in FIG. 4B. The center support 70 includes one or more handles to help maneuver and operate the pipeline inspection device 10. In the embodiment illustrated in FIG. 4A, the center support 70 includes a first handle 98 extending in forward direction above the drum 34. In other embodiments, the handle 98 may be oriented in a different direction. For example, in some embodiments, the handle 98 may extend backwards, away from the drum 34 or may extend in a vertical direction. In the embodiment illustrated in FIG. 4B, the center support 70 includes a first handle 98b extending in a forward direction above the drum 34, as shown in FIG. 4A. In addition, the center support 70 in FIG. 4B also includes a second handle 102 extending vertically. In the illustrated embodiment, the second handle 102 is an extendable handle, such as a telescoping handle, that may be extended to a greater length.

Additionally, the center support 70 also includes a monitor mount 110 (shown in both FIGS. 4A and 4B), which can be used to support a monitor or other components of the pipeline device 10. The monitor and display will be described in greater detail herein. Furthermore, in some embodiments, such as FIG. 4A, the center support may include a backpack plate 242 that enables a user to carry the reel 26 on his/her back. For example, the backpack plate 242 can be coupled to backpack straps or a full backpack to enable a user to carry the reel 26 as a backpack. In the illustrated embodiment, the backpack plate 242 is removably attached to the center support 70.

Referring back to FIGS. 2-3, the drum 34 and the hub 30 are supported on the stand 38 by a mounting assembly 118. The mounting assembly 118 includes a rotatable portion 90 and a fixed portion 94. The drum 34 is mounted on the rotatable portion 90 of the mounting assembly 118, while the hub 30 is mounted to the reel 26 via the fixed portion 94 of the mounting assembly 118. The mounting assembly 118 includes a mounting plate 122, a shaft 126, a slip ring 130, and a core 138. The rotatable portion 90 of the mounting assembly 118 includes the mounting plate 122 and (a portion of) the slip ring 130, which are rotatably fixed relative to one another. Thus, the drum 34, the mounting plate 122, and the slip ring 130 rotate together relative to the stand 38. The fixed portion 94 (which may also be referred to as a stationary portion) of the mounting assembly 118 includes the shaft 126 and the core 138. The hub 30 is attached to the core 138 and, thus, remains rotatably fixed (i.e., stationary) relative to the stand 38.

More specifically, the shaft 126 is coupled to the center support 70 of the stand 38. The shaft 126 provides a cantilevered support for the drum 34 above the base 66 of the stand 38. The mounting plate 122 is fixed to the back wall 42 of the drum 34. In some embodiments, the mounting plate 122 is integral with the back wall 42 of the drum 34. The slip ring 130 is supported on the shaft 126 and engages with the back wall 42 of the drum 34. The slip ring 130 allows for transmission of electrical signals, while allowing the drum 34 to rotate relative to the reel 26. The mounting plate 122 and the slip ring 130 rotatably support the drum 34 on the shaft 126. The core 138 is coupled to a distal end of the shaft 126 and extends into the interior 54 of the drum 34. The core 138 supports the hub 30 when the hub 30 is inserted into the interior 54 of the drum 34 via the opening 58 on the front wall 46.

Figure 5:
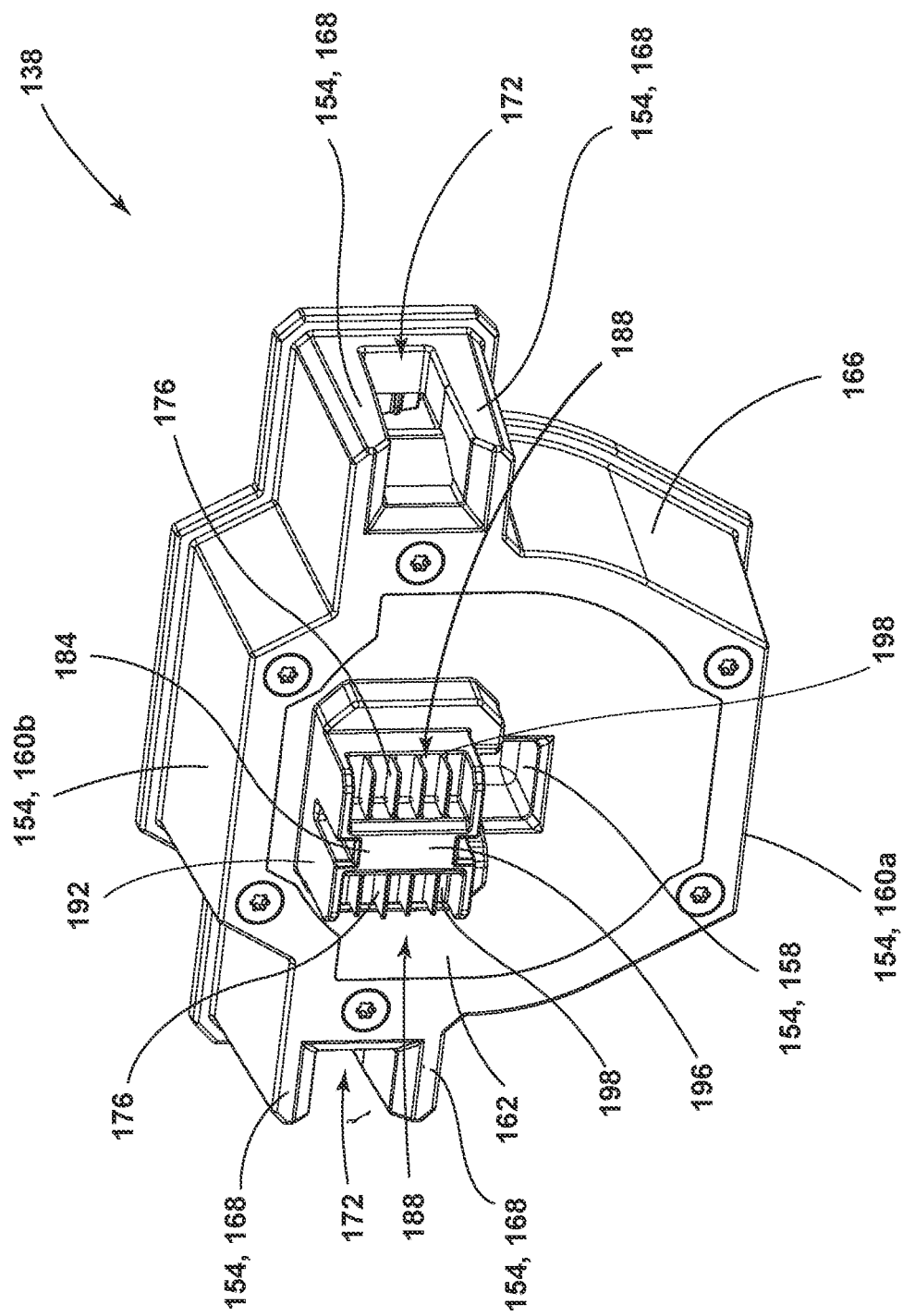
FIG. 5 is a perspective view of a core of a mounting assembly.
Figure 6:
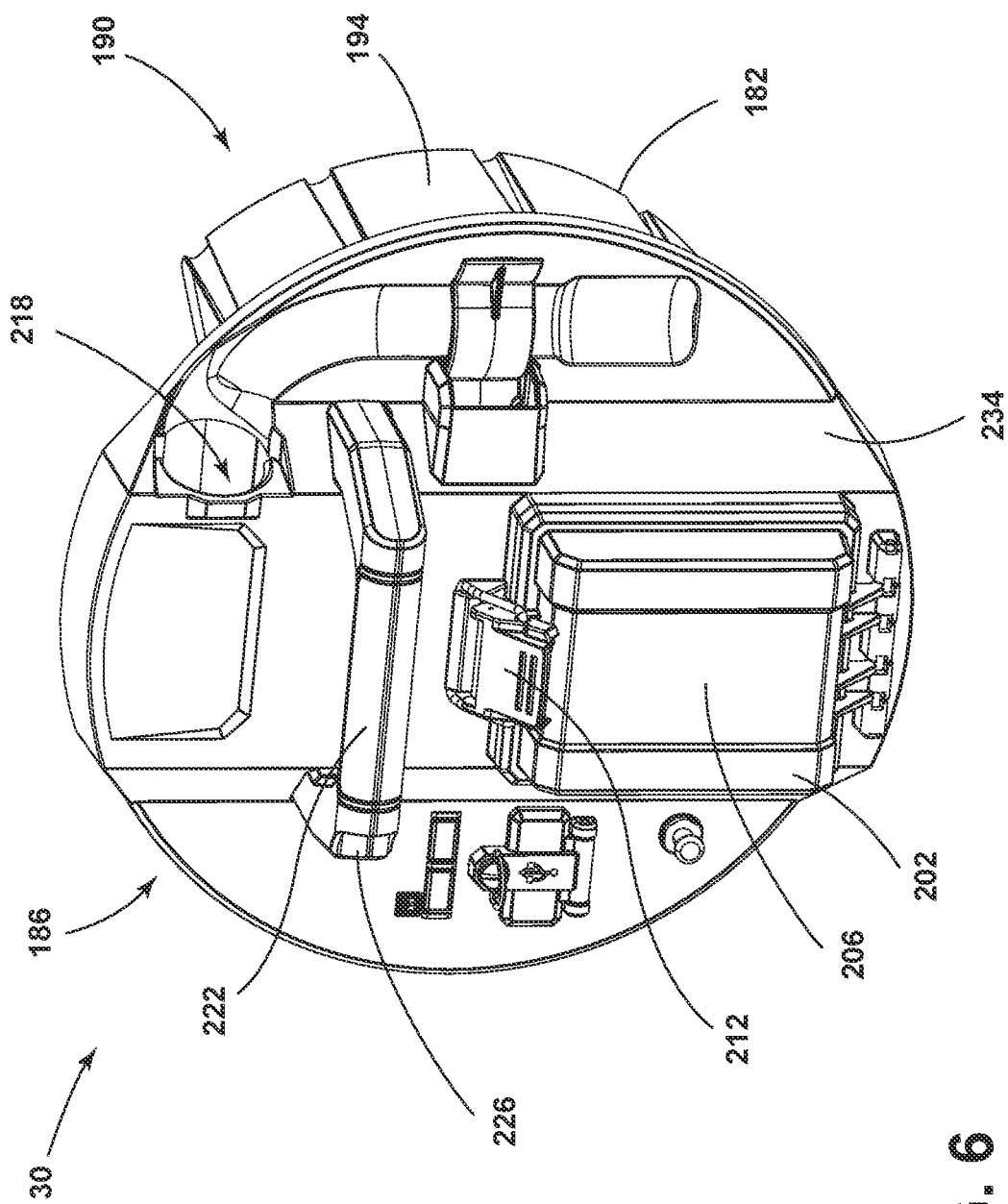
FIG. 6 is a front perspective view of a hub according to one embodiment.
Figure 7:
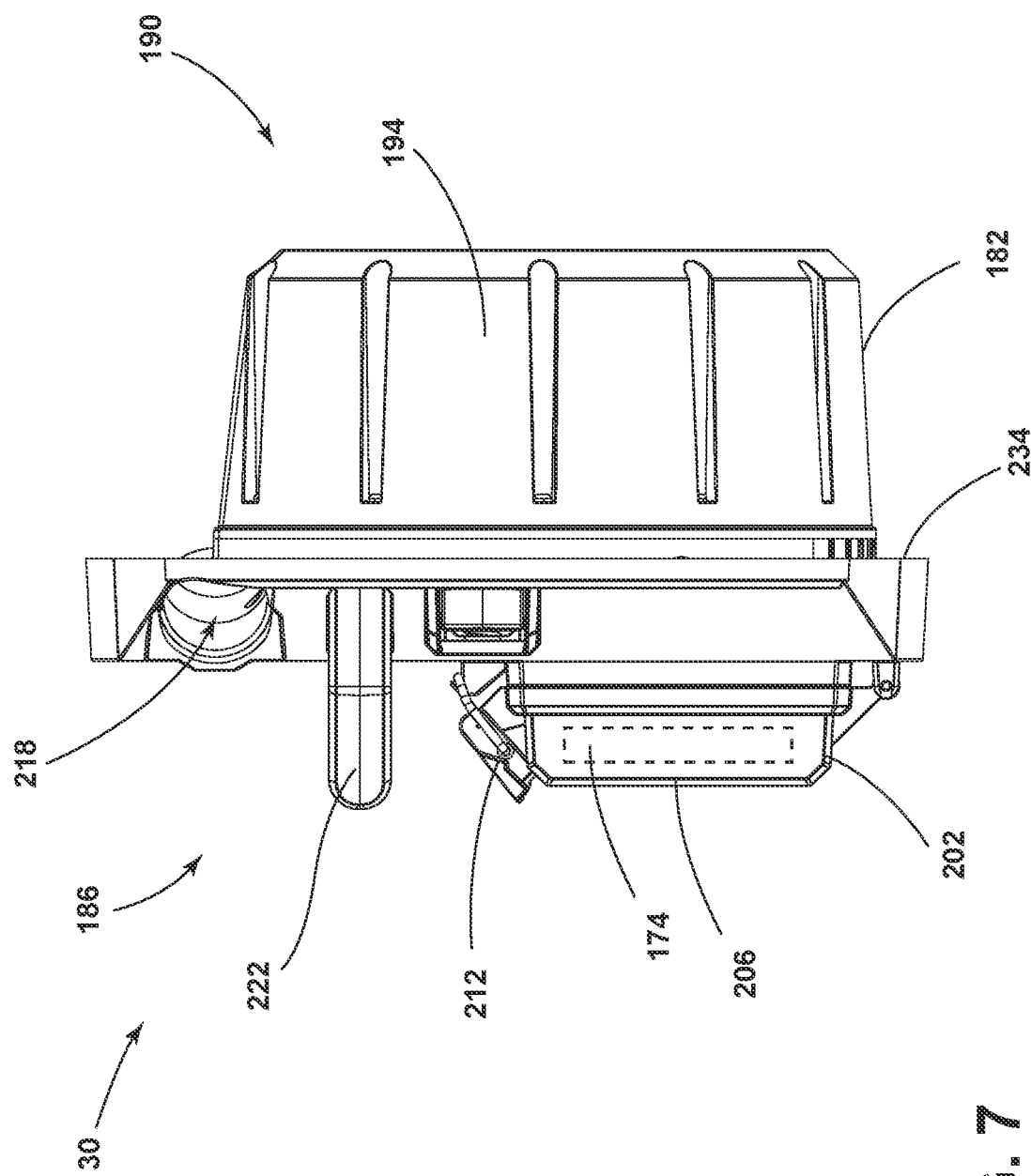
FIG. 7 is a side view of the hub illustrated in FIG. 6.
Figure 8:
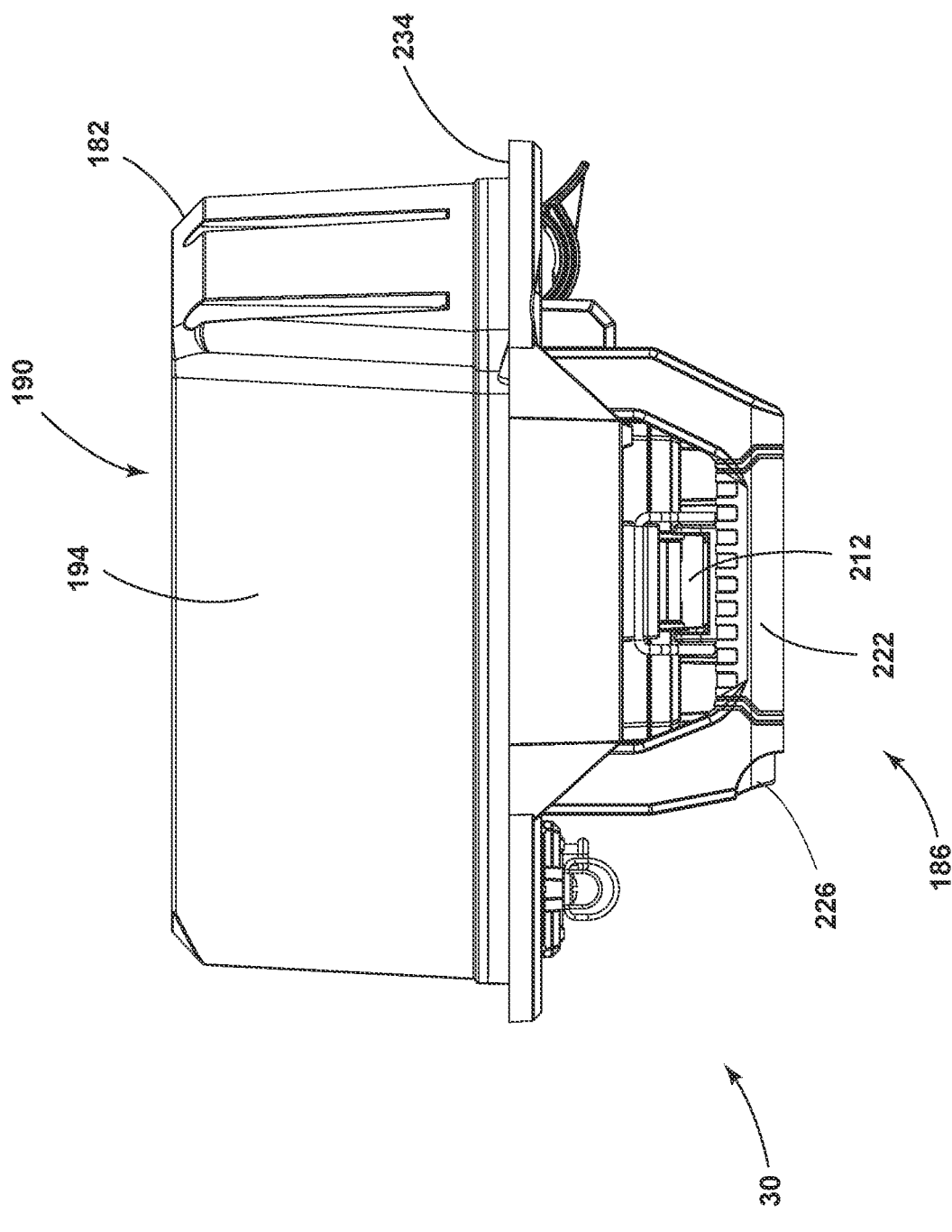
FIG. 8 is a top view of the hub illustrated in FIG. 6.

With reference to FIG. 5, the core 138 has a generally polygonal front face 162 with a side wall 166 extending around the perimeter of the face 162. The core 138 also includes a plurality of engagement members 154 that enable the hub 30 to be removably coupled to the reel 26. The engagement members 154 are sized and shaped to engage with corresponding engagement members 170 on the hub 30.

Specifically, in the illustrated embodiment, the core 138 includes a first type of engagement member 154 in the form of a flattened portion 160 formed along the side wall 166 of the core 138. In the illustrated embodiment, the core 138 includes a first flattened portion 160a formed along a bottom of the core 138 and a second flattened portion 160b formed along a top of the core 138. The flattened portions 160 help to create a secure engagement between the core 138 and the hub 30. In addition, when the hub 30 is coupled to the stand 38, the flattened portions 160 help prevent rotation of the hub 30 relative to the core 138. In other embodiments, the core 138 can include fewer or additional flattened portions 160.

The core 138 also includes a second type of engagement member 154 in the form of a pair of arms 168 extending radially outward from the side wall 166. In the illustrated embodiment, one pair of arms 168 extends from a left side of the core 138 and another pair of arms 168 extends from a right side of the core 138. A space 172 is formed between each pair of arms 168. As will be described in greater detail below, the space 172 is sized and shaped to receive one of the engagement members 170 on the hub 30.

In addition, the core 138 includes a third type of engagement member 154 in the form of a recess 158. The core 138 includes at least one recess 158 that aligns and engages with a portion of the hub 30. Specifically, in the illustrated embodiment, the core 138 includes the recess 158 on the face 162 of the core 138. The recess 158 is sized and shaped to receive an engagement member 170 on the hub 30. In some embodiments, the core 138 may include a projection and the hub may include a recess sized and shaped to receive the projection.

In other embodiments, the core 138 can include additional or fewer engagement members 154. In addition, the core 138 may include engagement members 154 of different types that are suitable to provide a coupling mechanism for the hub 30 to be secured to the core 138. For example, the core 138 may include various projections and/or recesses on the core 138 to correspond to engagement members 170 on the hub 30. In one embodiment, the core 138 includes a projection extending radially outwardly from the side wall 166. In another embodiment, the core 138 includes three projections: one projection extending in a downward direction towards the ground when the reel 26 is in an upright position, and two projections extending in an upward direction when the reel 26 is in an upright position. When the hub 30 is coupled to the core 138, the projections prevent the hub 30 from rotating relative to the drum 34 and stand 38. Accordingly, in some embodiments, the projections may replace the flattened portions 160. In other embodiments, the projections 164 may be replaced with recesses that receive projections 164 on the hub 30.

With reference to FIG. 5, the core 138 also includes electrical connections 176 (e.g., terminal blocks) that engage with electrical connections 180 on the hub 30. More specifically, the core 138 includes two electrical connections 176 disposed on the face 162 of the core 138. In other embodiments, different types of electrical connections 176 may be used. The core 138 includes a housing 184 for receiving and protecting the electrical connections 176. The housing 184 projects from the face 162 of the core 138 and includes two openings 188 for receiving the two electrical connections 176. In the illustrated embodiment, the openings 188 are each formed by two side walls 192 and a back wall 196 forming a U-shape. The openings 188 are oriented in opposed directions and share the back wall 196. In other embodiments, the housing 184 can have different sizes and shapes to accommodate different types of electrical connections 176. The core 138 supports the hub 30 on the reel 26 such that the electrical connections 176 on the core 138 engage with the electrical connections 180 on the hub 30.

Referring to FIGS. 6-10, the hub 30 includes a cylindrical body 182 that is received within the interior 54 of the drum 34 and supported on the reel 26. The cylindrical body 182 is defined by a front end 186, a rear end 190, and an outer wall 194 extending around the perimeter of the hub 30 between the front end 186 and the rear end 190. The cylindrical body 182 defines a housing for maintaining the electrical components of the pipeline inspection device 10. The hub 30 includes a power source and other electrical components for operating the pipeline inspection device 10. For example, the hub 30 includes a battery 174 (FIG. 7) and the electrical connections 180 that engage with the electrical connections 176 on the core 138. The electrical components of the hub 30 may also include a processor 278 (or controller), a memory source 282, a video processor 286, a wireless communication module 178 (e.g., a Wi-Fi hub, a Bluetooth module), etc. In other embodiments, the hub 30 may include more or fewer of these electrical components. In some embodiments, the body 182 is air and/or water tight in order to protect the electrical components.

In the illustrated embodiment, the front end 186 of the hub 30 includes a battery housing 202 for receiving the battery 174. The battery 174 is removable from the battery housing 202 of the hub 30. In some embodiments, the battery 174 may be a rechargeable power tool battery back, such an 18V Li-ion battery pack. The battery housing 202 includes a cover 206 that can be opened and closed to insert and remove the battery 174, respectively. The cover 206 is attached to the front end 186 by a hinge (not shown) and a latch 212. The hub 30 also includes a channel 218 extending through the cylindrical body 182 from the outer wall 194 to the front end 186. When the hub 30 is inserted in the drum 34, the channel 218 receives the cable 14 and helps guide the cable 14 into or out of the drum 34. The hub 30 includes a handle 222 provided on the front end 186 of the hub 30. The handle 222 extends outwardly from the front end 186 of the hub 30 and can be used to maneuver the hub 30 into the opening 58 of the drum 34. In the illustrated embodiment, the hub 30 also includes a rim 234 that extends around the perimeter of the cylindrical body 182 for mating with the opening 58 of the drum 34. When the hub 30 is received within the drum 34, the rim 234 engages with the edge of the opening 58 to help align the hub 30 relative to the drum 34.

Figure 9:
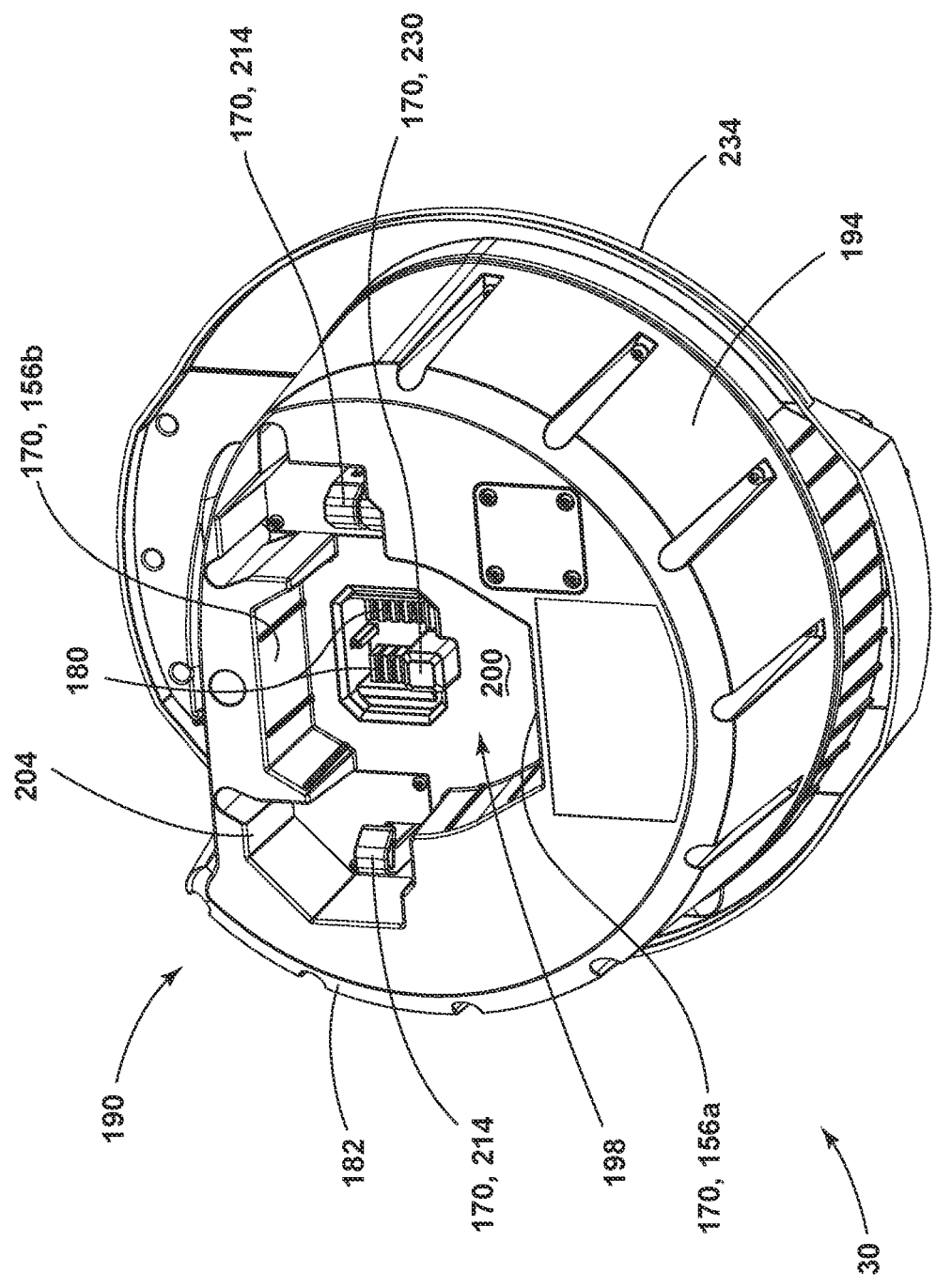
FIG. 9 is a first rear perspective view of the hub illustrated in FIG. 6.
Figure 10:
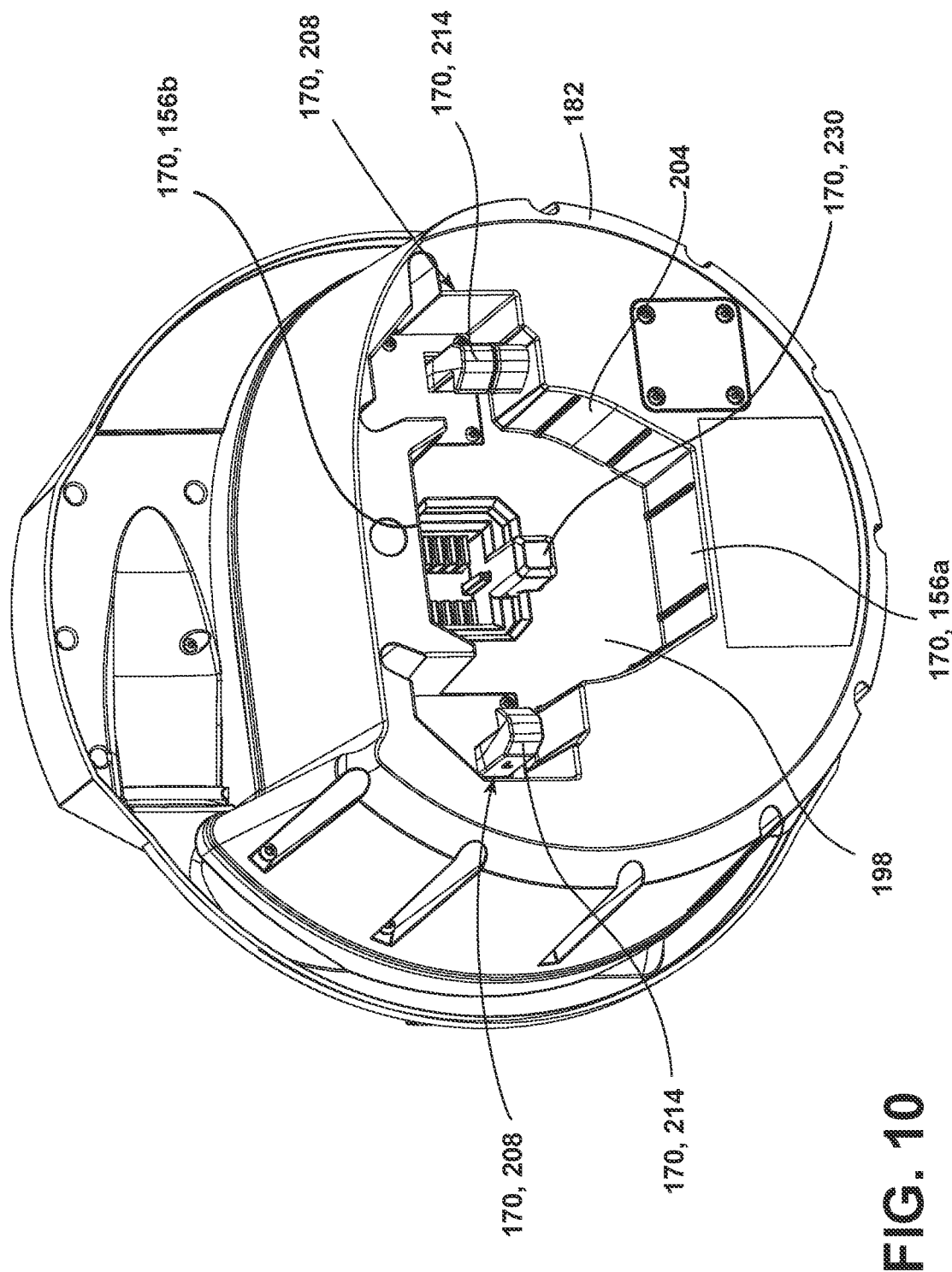
FIG. 10 is a second rear perspective view of the hub illustrated in FIG. 6.

With reference to FIG. 9-10, the rear end 190 of the hub 30 has a cavity 198 configured to receive the core 138 of the reel 26 so that the hub 30 can be supported within the interior 54 of the drum 34. Specifically, the cavity 198 is formed by a back wall 200 and a peripheral wall 204 extending around the perimeter of the back wall 200. The core 138 is received within the cavity 198 with the face 162 of the core 138 aligned with the back wall 200 of the hub 30, and the side wall 166 of the core 138 aligned with the peripheral wall 204 of the hub 30. The cavity 198 includes the electrical connections 180 that engage with the electrical connections 176 on the core 138. The electrical connections 180 are molded into the back wall 200 of the cavity 198. In the illustrated embodiment, the electrical connections are receivers for receiving the terminal blocks 176 on the core 138. In other embodiments, the electrical connections 180 may not be integral with the back wall 200.

With continued reference to FIGS. 9-10, the cavity 198 of the hub 30 also includes the engagement members 170 that engage with the engagement members 154 on core 138 of the reel 26. As mentioned, the engagement members 170 secure the hub 30 to the reel 26 and help align the hub 30 and maintain a solid connection between the hub 30 and the reel 26.

The peripheral wall 204 defines a first type of engagement member 170 in the form of a flattened portion 156. The flattened portion 156 formed in the peripheral wall 204 of the hub 30 is sized and shaped to correspond to the flattened portion 160 formed in the side wall 166 of the core 138. Accordingly, in the illustrated embodiment, the hub 30 includes a first flattened portion 156a corresponding to the first flattened portion 160a on the core 138, and a second flattened portion 156b corresponding to the second flattened portion 160b on the core 138. As mentioned, the flattened portions 156, 160 help prevent rotation of the hub 30 relative to the stand 38.

The cavity 198 also houses a second type of engagement member 170 in the form of one or more latches 214 that engage with the core 138 to secure the hub 30 to the reel 26. In the illustrated embodiment, the hub 30 includes two latches 214, however, in other embodiments a greater or fewer number of latches 214 may be used. The latches 214 are received within the space 172 between the pair of arms 168 on each side of the core 138, and clamp on to the side wall 166. As will be described in greater detail below, the latches 214 are movable between a locked position, in which the latches 214 are engaged the core 138, and an unlocked position, in which the latches 214 are disengaged from the core 138.

The handle 222 includes a trigger 226 that activates the latches 214 on the rear end 190 of the cylindrical body 182. Pressing the trigger 226 rotates the latches 214 from the locked position to the unlocked position. In the illustrated embodiment, pressing the trigger 226 rotates the latches 214 outwardly to the unlocked position. The latches 214 are biased inwardly towards the locked position such that releasing the trigger 226 causes the latches 214 to automatically rotate towards the locked position.

Figure 11:
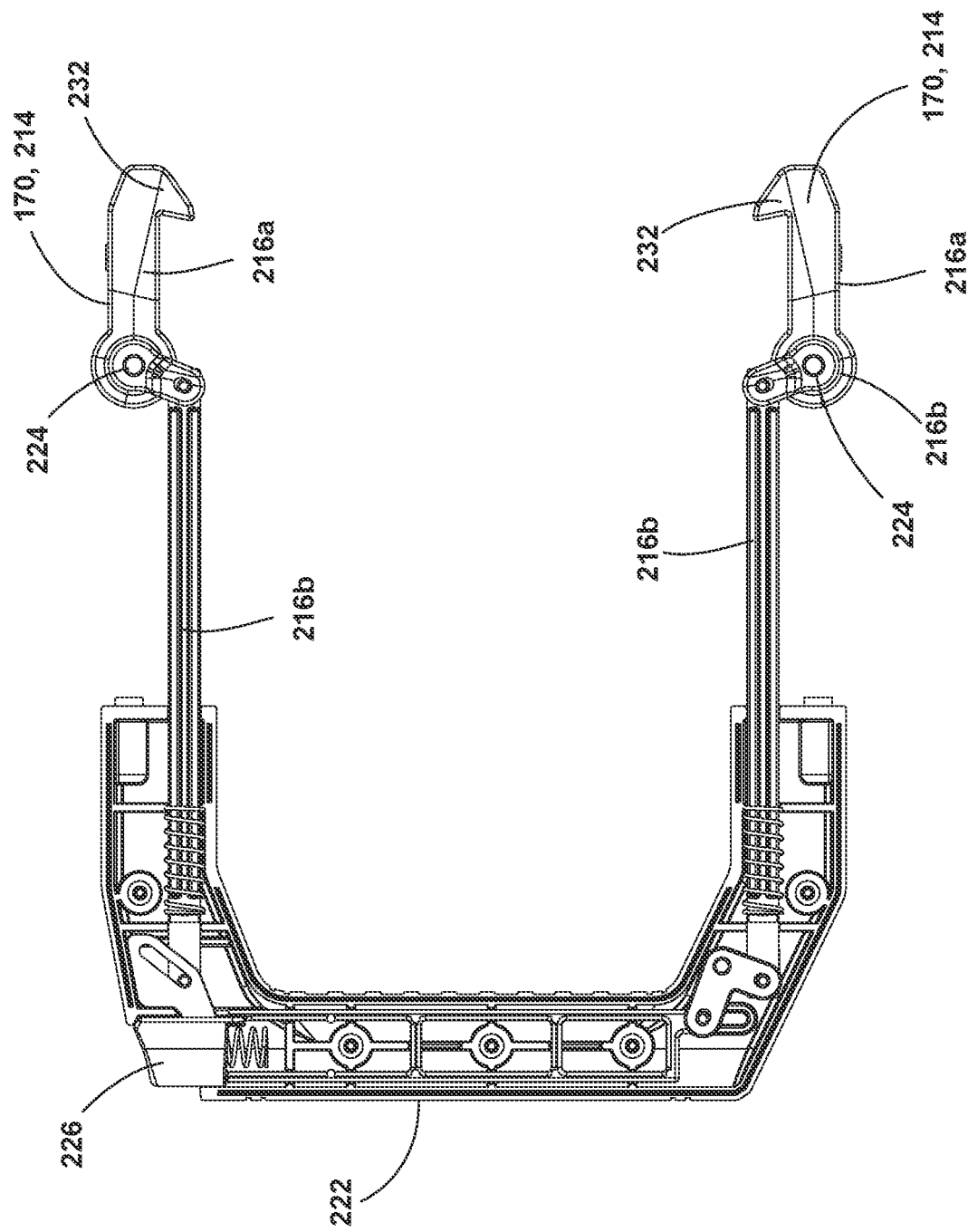
FIG. 11 is a detailed view of an engagement member of the hub.
Figure 12:
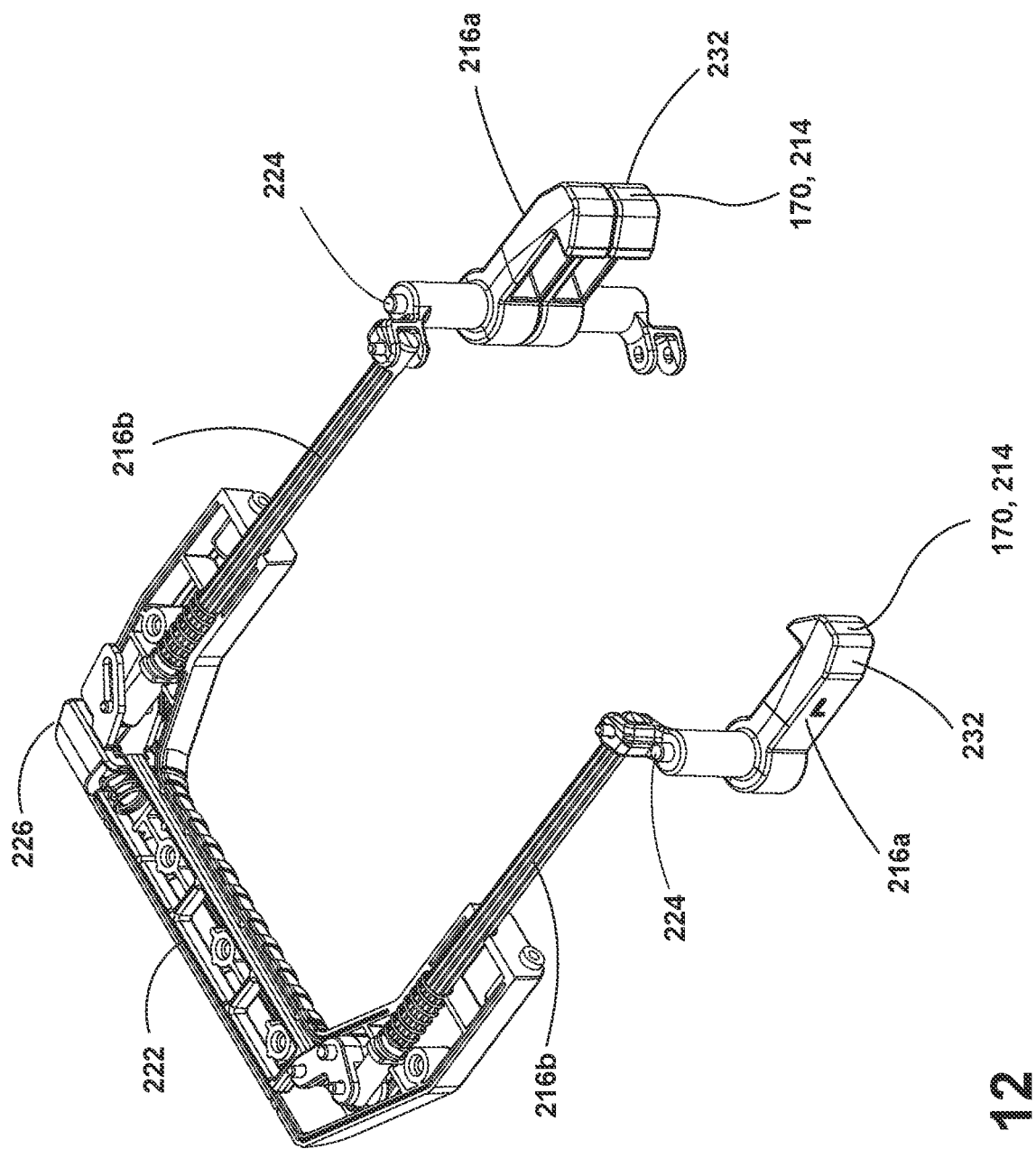
FIG. 12 is another detailed view of the engagement member illustrated in FIG. 10.

With reference to FIGS. 11-12, each latch 214 includes a plurality of linkages 216 that work together to adjust the latches 214 between the locked and unlocked positions. In the illustrated embodiment, the latches 214 each include a first linkage 216a with a hook 232 configured to engage the core 138. Specifically, the hooks 232 can grip an engagement member 154 of the core 138 to couple the hub 30 within the interior 54 of the drum 34. The first linkage 216a is rotatable about a pivot point 224 between the locked and unlocked positions. A second linkage 216b causes rotation of the first linkage 216a. The second linkage 216b is actuated by the trigger 226 to cause rotation of the first linkage 216a to release the hook 232 from the core 138 of the reel 26.

The hub 30 also includes a third type of engagement member 170 in the form of a protrusion 230. As shown in FIG. 9, the cavity 198 of the hub 30 includes at least one protrusion 230 that is shaped to align with the recesses 158 (FIG. 5) on the core 138. For example, the hub 30 includes a square protrusion 230 that is received within the square recess 158 on the face 162 of the core 138. In some embodiments, the protrusion 230 defines a pocket that receives a sensor for monitoring the amount of cable 14 that has been extended from the drum 34. Additionally, in some embodiments, the hub 30 may also include additional protrusions or recesses corresponding to protrusions and recesses on the core 138.

To couple the hub 30 to the stand 38, the hub 30 is inserted into the interior 54 of the drum 34 and the core 138 is received within the cavity 198 of the hub 30. The contact between the engagement members 170 on the hub 30 and the engagement members 154 on the core 138 help orient the hub 30 and guide the hub 30 onto the core 138. As previously mentioned, the hub 30 is removable from the drum 34 and may be attached to two different sized reels 26. Pipes typically come in two different sizes: a 1.5 to 3 inch diameter pipe and a 3 to 6 inch diameter pipe. Each of the two types of pipes requires a different diameter camera and cable. The smaller pipe (i.e., 1.5 to 3 inch pipe) requires a smaller diameter camera and cable that is more flexible, while the larger pipe requires a larger diameter camera and cable. Each of the smaller diameter camera and cable and the larger diameter camera and cable requires a corresponding large or small sized reel and cable drum, which are part of correspondingly sized pipeline inspection devices. For example, FIGS. 4A and 4B illustrate different styles of pipeline inspection devices 10a, 10b, such as a backpack style 10a and a rolling style 10b. FIG. 4A illustrates a smaller style reel 26a and drum 34a, which can be carried as a backpack, while FIG. 4B illustrates a large style reel 26b and drum 34b, which may be rolled from one location to another. In the illustrated embodiment, the hub 30 may be removably detached and interchangeably attached to each of the drums of the different sized pipeline inspection devices, such that a user only needs a single hub 30 containing the electronics (e.g., the video processor, the battery, the wireless communication module (Wi-Fi hub), etc.) that can be used with either of the reels 26.

Figure 13:
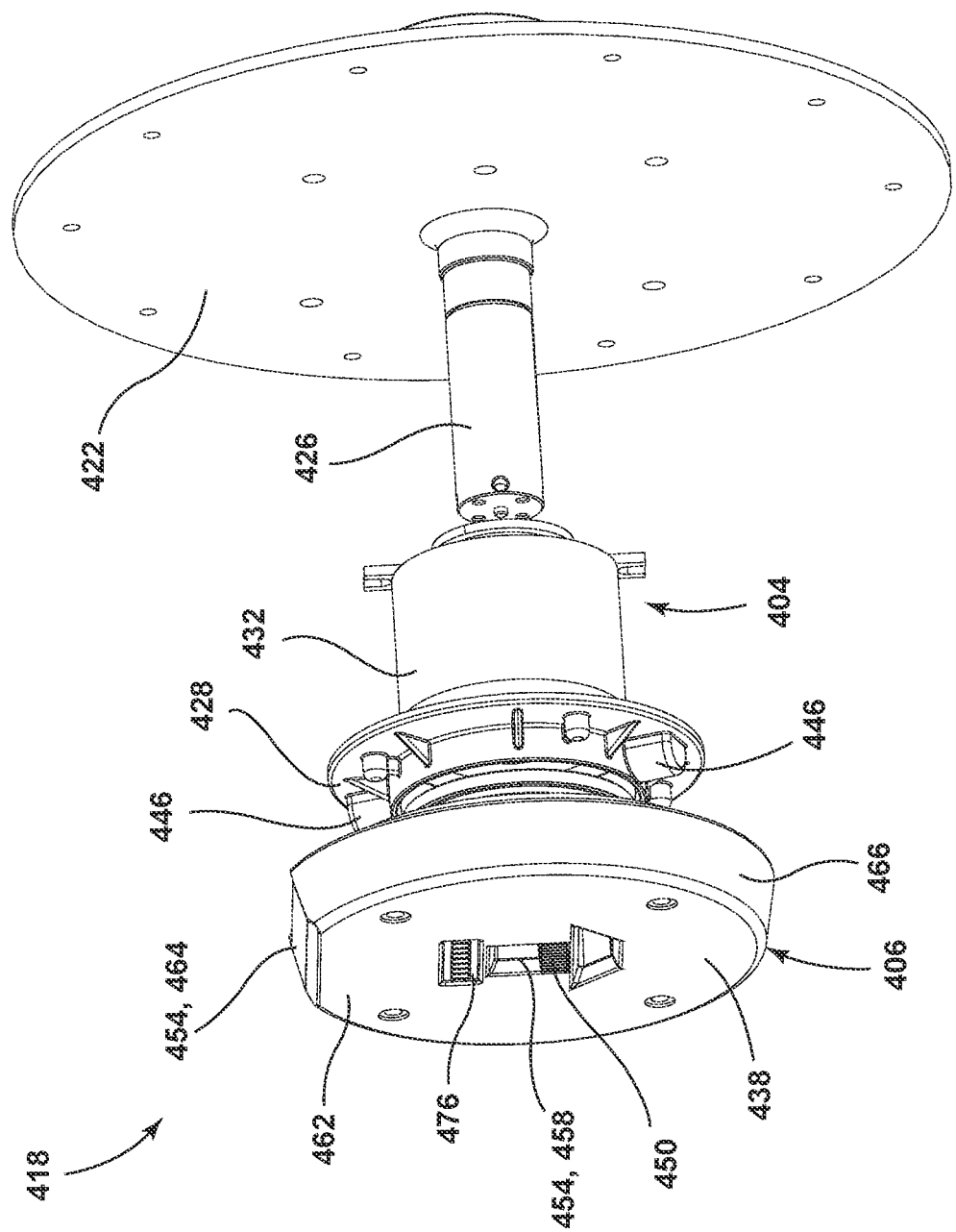
FIG. 13 illustrates a mounting assembly for use with the pipeline inspection device.

FIGS. 13-16 illustrate a mounting assembly 418 (FIG. 13) and a hub 430 (FIGS. 14-16) according to another embodiment. With reference to FIG. 13, the mounting assembly 418 includes a rotatable portion 404 and a fixed portion 406. A drum is mounted on the rotatable portion 404 of the mounting assembly 418, while the hub 430 is mounted to the reel 26 via the fixed portion 406 of the mounting assembly 418. The mounting assembly 418 includes a mounting plate 422, a shaft 426, a slip ring 432, a disk 428, and a core 438. The rotatable portion 404 of the mounting assembly 418 includes the mounting plate 422, (a portion of) the slip ring 432, and the disk 428. Thus, mounting plate 422, the slip ring 432, and the disk 428 are rotatably fixed relative to one another, and rotate together with the drum 34. The fixed portion 406 of the mounting assembly 418 includes the shaft 426 and the core 438. The shaft 426 and the core 438 are rotatably fixed relative to one another and relative to the stand 38.

The shaft 426 is coupled to a center support of a stand. The shaft 426 provides a cantilevered support for the drum above a platform of the stand. The mounting plate 422 is fixed to the back wall of the drum. In some embodiments, the mounting plate 422 is integral with the back wall of the drum. The slip ring 432 is disposed within a space 442 formed by the back wall of the drum. The slip ring 432 allows for transmission of electrical signals, while allowing the drum to rotate relative to the reel. The mounting plate 422 and the slip ring 432 rotatably support the drum on the shaft 426.

The disk 428 also rotates with the drum. The disk 428 includes magnets 446 that rotate with the disk 428 and the drum as the cable is unwound from the drum. The magnets 446 are used in conjunction with a sensor 450 on the hub 430 to measure how much cable has been unwound. Specifically, as the drum rotates, the magnets 446 rotate about the axis of the drum. The sensor 450 (e.g., a Hall sensor) is located on the stationary hub 430 along the axis. As the magnets 446 rotate, the sensor 450 can monitor 114 the movement of the magnets 446 to determine how much cable has been extended from the drum.

With continued reference to FIG. 13, the core 438 is coupled to a distal end of the shaft 426. The core 438 does not rotate with the drum, but rather, is fixed relative to the shaft 426 and the stand. The core 438 supports the hub 430 when the hub 430 is inserted into the interior 54 of the drum via an opening on the front wall 46. The core 438 also includes electrical connections 476 that engage with electrical connections 480 on the hub 430. The core 438 includes a plurality of engagement members 454 that enables the hub 430 to be removably coupled to the reel.

In the illustrated embodiment, the core 438 has a generally circular face 462 with a side wall 466 extending around the perimeter of the face 462. One of the engagement members 454 is formed along the side wall 466 on a top side of the core 438. Specifically, one of the engagement members 454 is formed by a flattened portion 464 of the side wall 466. The hub 430 can grip the core 438 along the flattened portion 464 of the side wall 466. The flattened portion 464 also prevents the hub 430 from rotating relative to the core 438 and the stand. In addition, the core 438 includes another engagement member 454 in the form of a recess 458 that aligns and engages with a portion of the hub 430. The recesses 458 help secure the hub 430 to the reel and maintain a slide electrical connection between the two. In other embodiments, the core 438 may include additional engagement members 454 for coupling to the hub 430.

Figure 14:
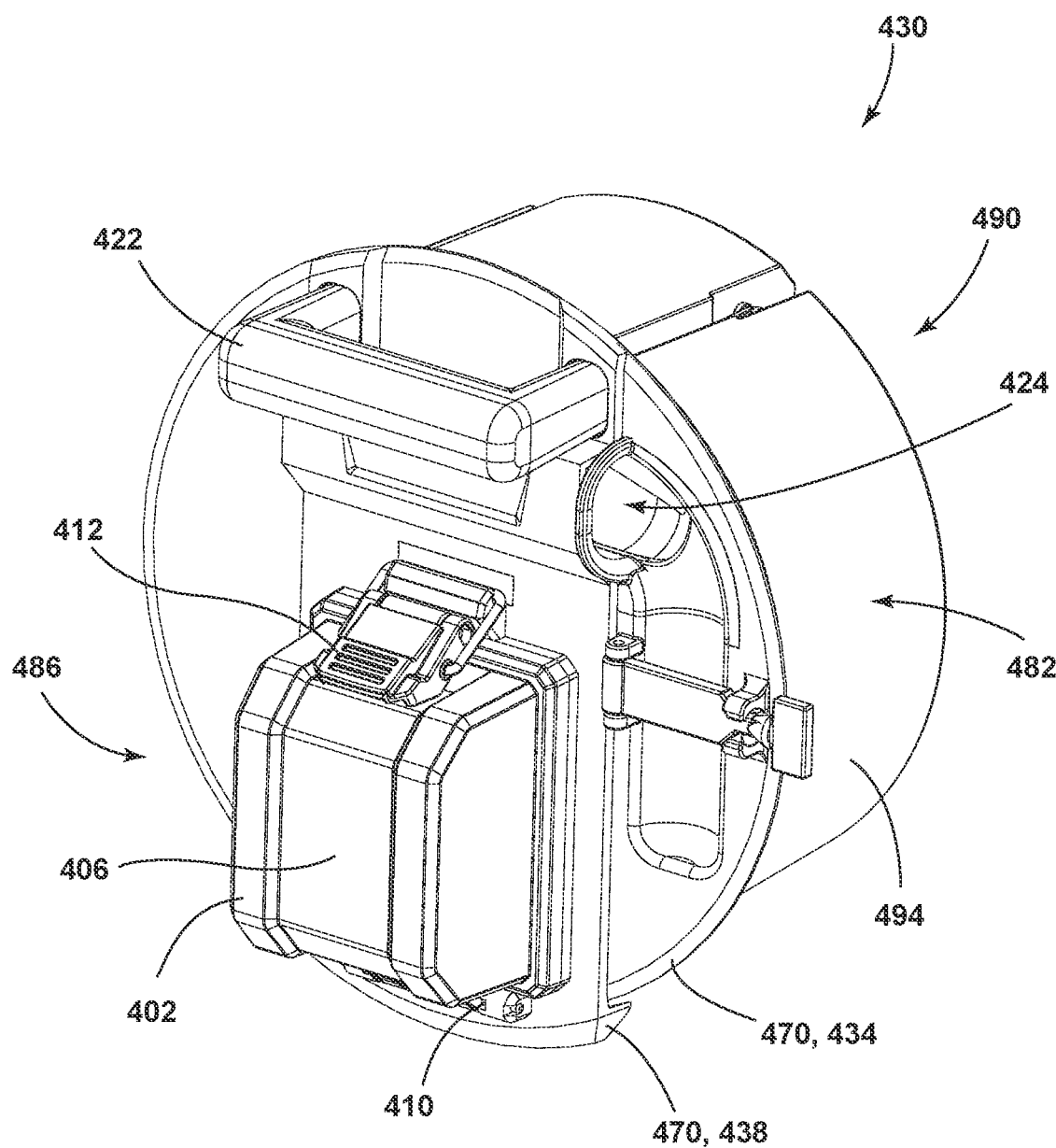
FIG. 14 is a front perspective view of the hub according to a second embodiment.
Figure 15:
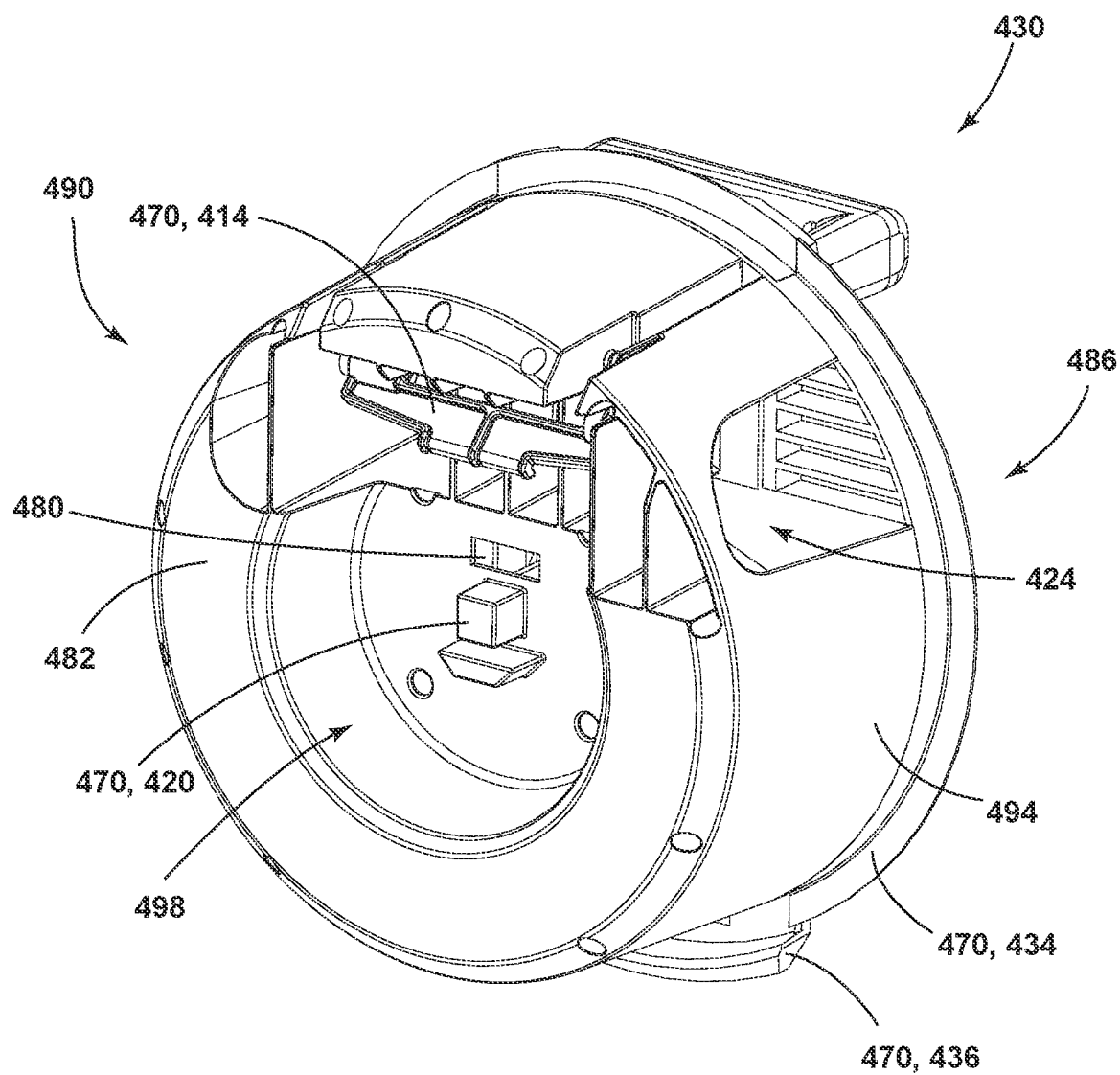
FIG. 15 is a rear perspective view of the hub illustrated in FIG. 15.
Figure 16:
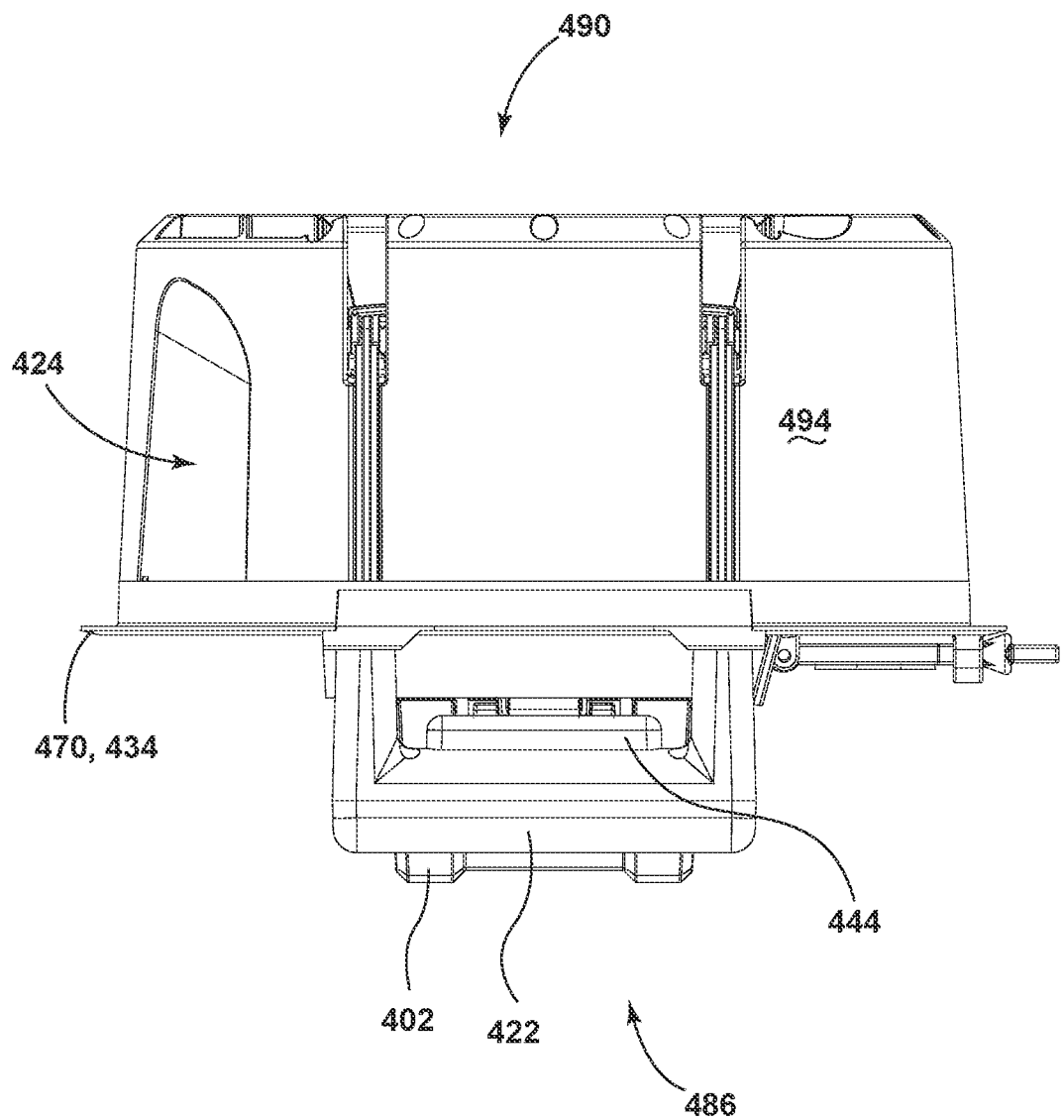
FIG. 16 is a top view of the hub illustrated in FIG. 15.

Referring to FIGS. 14-16, the hub 430 includes a cylindrical body 482 that is received within an interior of the drum. The cylindrical body 482 is defined by a front end 486, a rear end 490, and an outer wall 494 extending around the perimeter of the hub 430 between the front end 486 and the rear end 490. The rear end 490 of the hub 430 has a cavity 498 that includes various engagement members 470 that engage with the core 438 of the reel. The engagement members 470 secure the hub 430 to the reel and help align the hub 430 and maintain a solid connection between the hub 430 and the reel.

The cylindrical body 482 defines a housing for maintaining the electrical components of the pipeline inspection device 10. In the illustrated embodiment, the front end 486 of the hub 430 includes a battery housing 402 for receiving a battery. The battery is removable from the battery housing 402 of the hub 430. The battery housing 402 includes a cover 406 that can be opened and closed to insert and remove the battery, respectively. The cover 406 is attached to the front end 486 by a hinge 410 and a latch 412. The hub 430 also includes a channel 424 extending through the cylindrical body 482 to receive the cable and helps guide the cable into or out of the drum.

In addition, the hub 430 includes a handle 222 provided on the front end 486 of the hub 430. The handle 222 extends outwardly from the front end 486 of the hub 430 and can be used to maneuver the hub 430 into the opening of the drum. The handle 222 includes a trigger 444 (FIG. 16) that activates a latch 414 on the rear end 490 of the cylindrical body 482. The latch 414 is one of the engagement members 470 disposed within the cavity 498 of the hub 430. The latch 414 is configured to engage with the engagement member 454 on the core 438 of the mounting assembly 418 of the reel. Pressing the trigger 444 rotates the latch 414 from a locked position to an unlocked position. In the illustrated embodiment, pressing the trigger 444 rotates the latch 414 upward into the unlocked position. The latch 414 is biased towards the locked position such that releasing the trigger 444 causes the latch 414 to rotate automatically downward and into the locked position.

The hub 430 also includes various other engagement members 470 that help align and support the hub 430 within the drum. The cavity 498 of the hub 430 includes at least one protrusion 420 that is shaped to align with the recesses 458 on the core 438 of the mounting assembly 418. For example, the hub 430 includes a square protrusion 420 that is received within the square recess 458 on the face 462 of the core 438. The protrusion 420 defines a pocket that receives the sensor 450 for monitoring movement of the magnets 446 to help determine the amount of cable that has been extended from the drum. In some embodiments, the core 438 and the hub 430 may include more or fewer recesses 458 and protrusions 430, respectively, to help align the hub 430 with the drum. In the illustrated embodiment, the hub 430 also includes an engagement member 470 in the form of a rim 434 that extends around the perimeter of the cylindrical body 482 for mating with the opening of the drum. When the hub 430 is received within the drum, the rim 434 engages with the edge of the opening to help align the hub 430 relative to the drum. In the illustrated embodiment, the rim 434 further includes a hook 436 to help grip the edge of the opening in the drum. In the illustrated embodiment, the hook 436 is arcuate and extends along a bottom edge of the rim 434.

Figure 17:
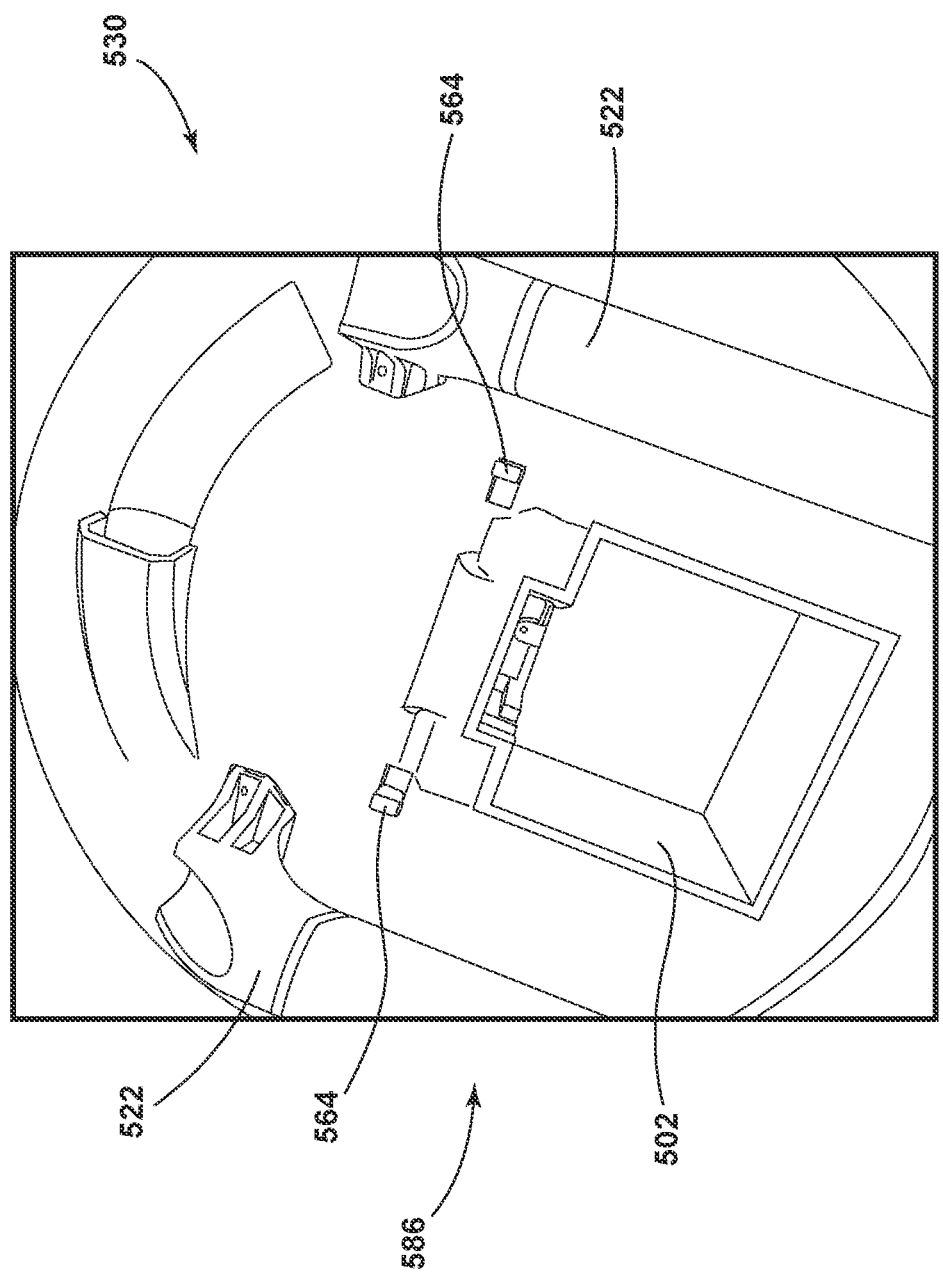
FIG. 17 is a front perspective view of a hub according to a third embodiment.
Figure 18:
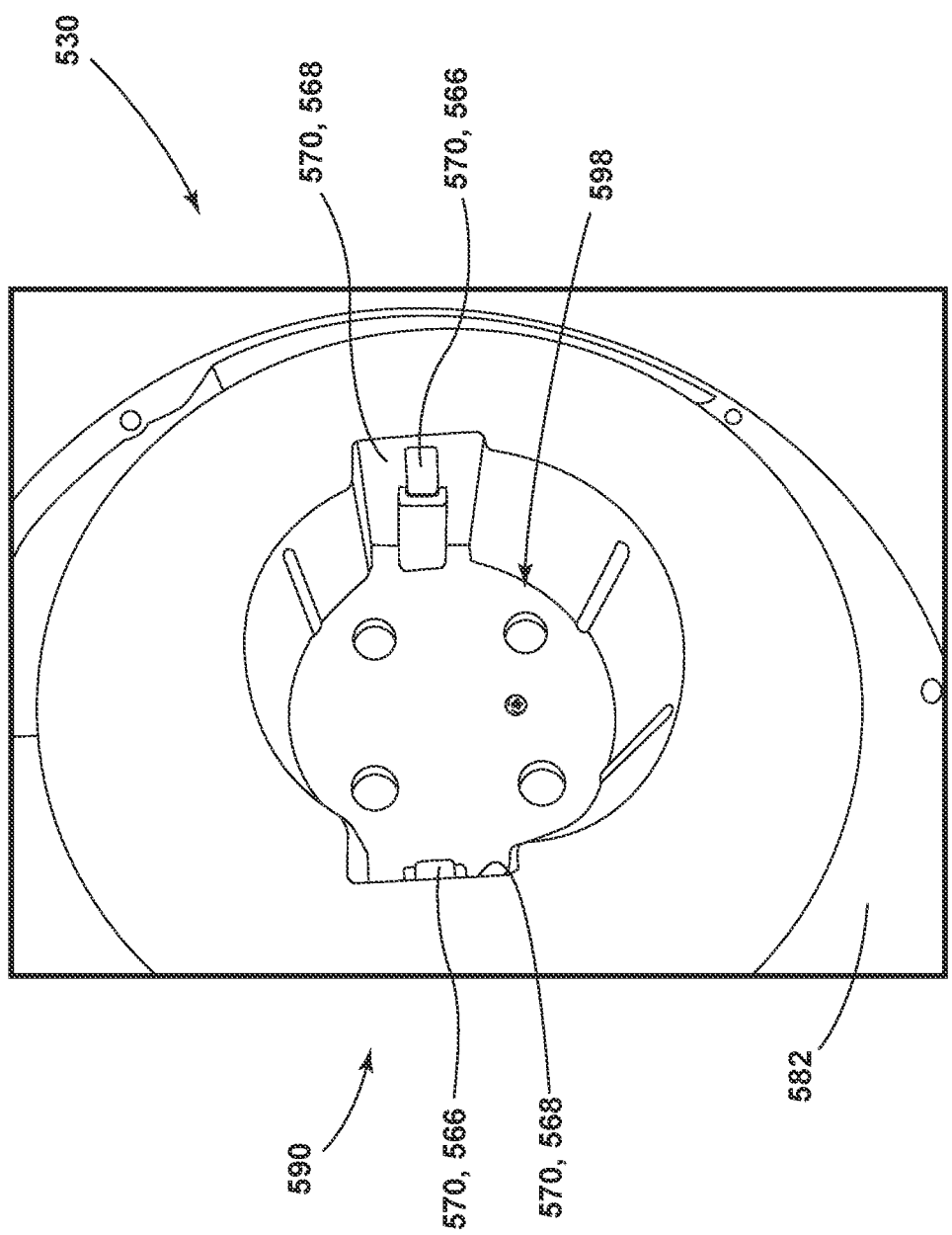
FIG. 18 is a rear perspective view of the hub illustrated in FIG. 18.

FIGS. 17-18 illustrate a hub 530 according to yet another embodiment. The hub 530 includes a cylindrical body 582 for maintaining the electrical components of a pipeline inspection device. A front end 586 of the hub 530 includes a battery housing 502 for receiving a battery. The front end 586 also includes two handles 522. The handles 522 are spaced apart such that one handle 522 is on each side of the battery housing 502. The handles 522 are generally parallel to one another and extend in a vertical direction when the hub 530 is received within the drum.

A rear end 590 of the hub 530 is configured to receive a core of a stand to support the hub 530 on the stand.

Specifically, the hub 530 includes a plurality of engagement members 570 that engage with the core 18. As shown in FIG. 18, the hub 530 includes a cavity 598 configured to receive the core. Inside of the cavity 598 are two engagement members 570 in the form of hooks 566. The hooks 566 can selectively grip the core to removably couple the hub 530 to the core. The hooks 566 are moved between a locked and an unlocked position by buttons 564 on the front end 586 of the hub 530. The hooks 566 are disposed within recesses 568 (another engagement member 570). The recesses 568 help align the hub 530 with the core to prevent rotation of the hub 530 relative to the core. In the illustrated embodiment, there are two buttons 564, each corresponding to one of the hooks 566. When the buttons 564 are squeezed inwardly, the hooks 566 are disengaged from the core. The hooks 566 are biased to a locked position such that releasing the buttons 564 automatically moves the hooks 566 towards the locked position.

Figure 19:
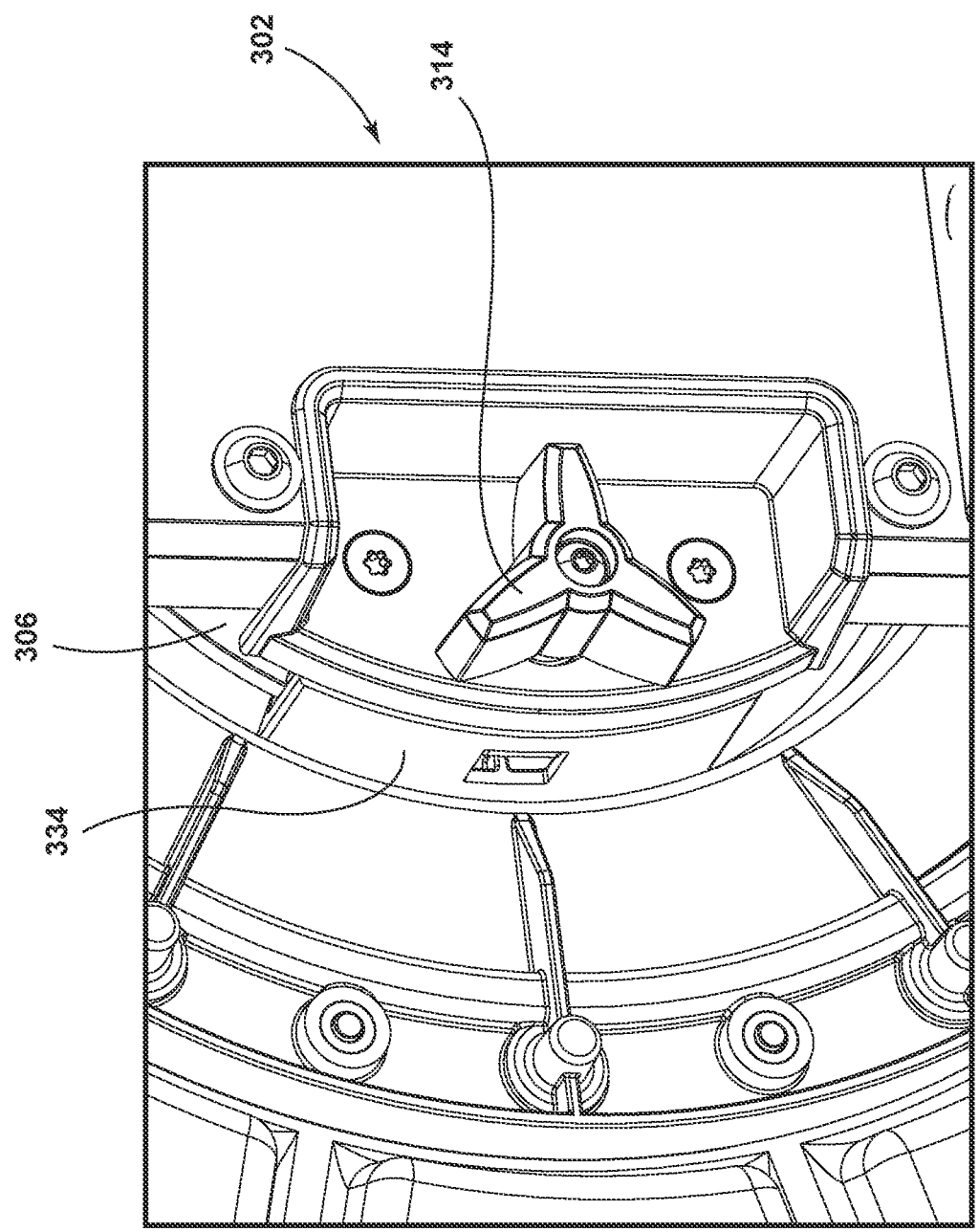
FIG. 19 is a first perspective view of a brake assembly for use with a pipeline inspection device.
Figure 20:
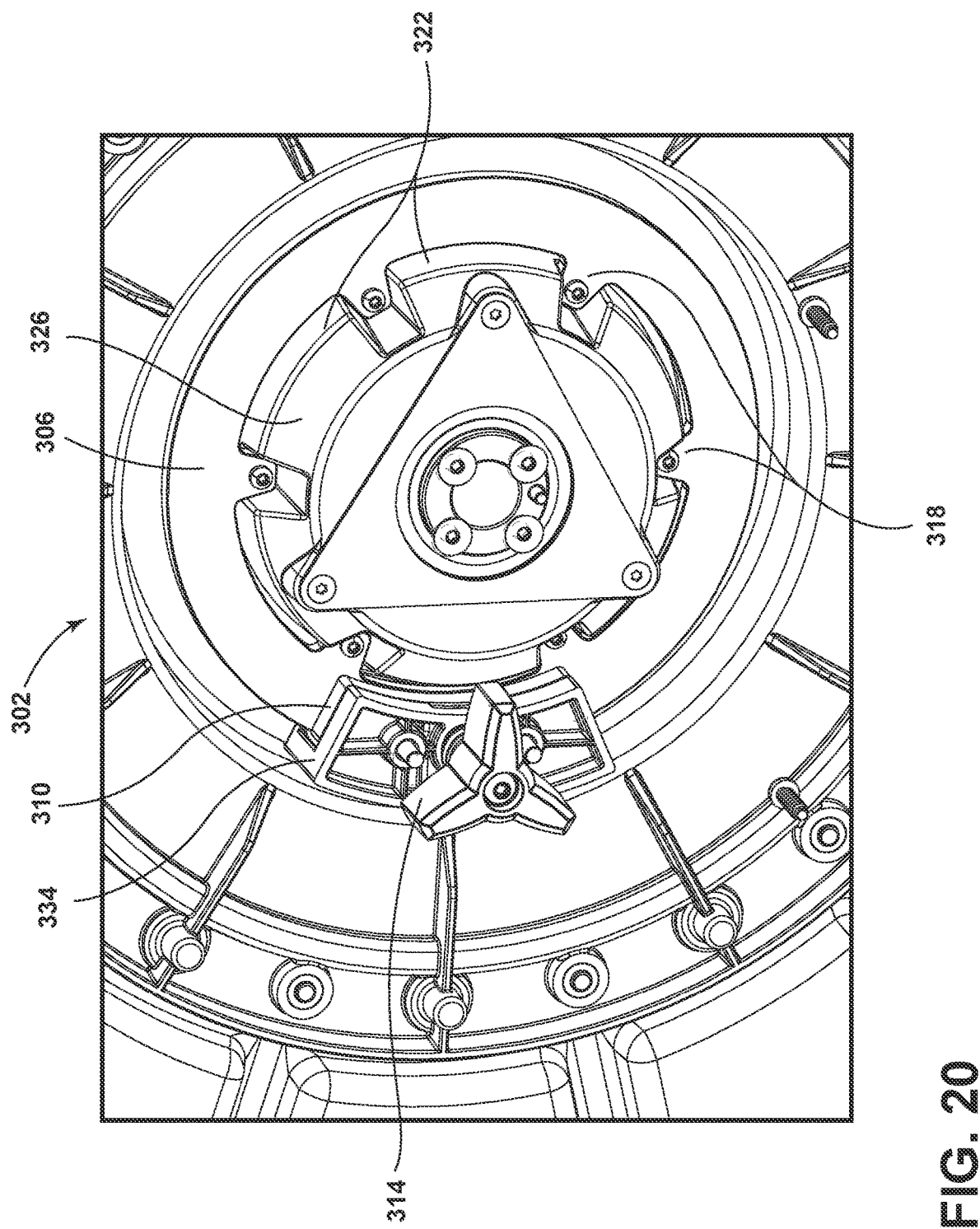
FIG. 20 is a second perspective view of the brake assembly of FIG. 20.
Figure 21:
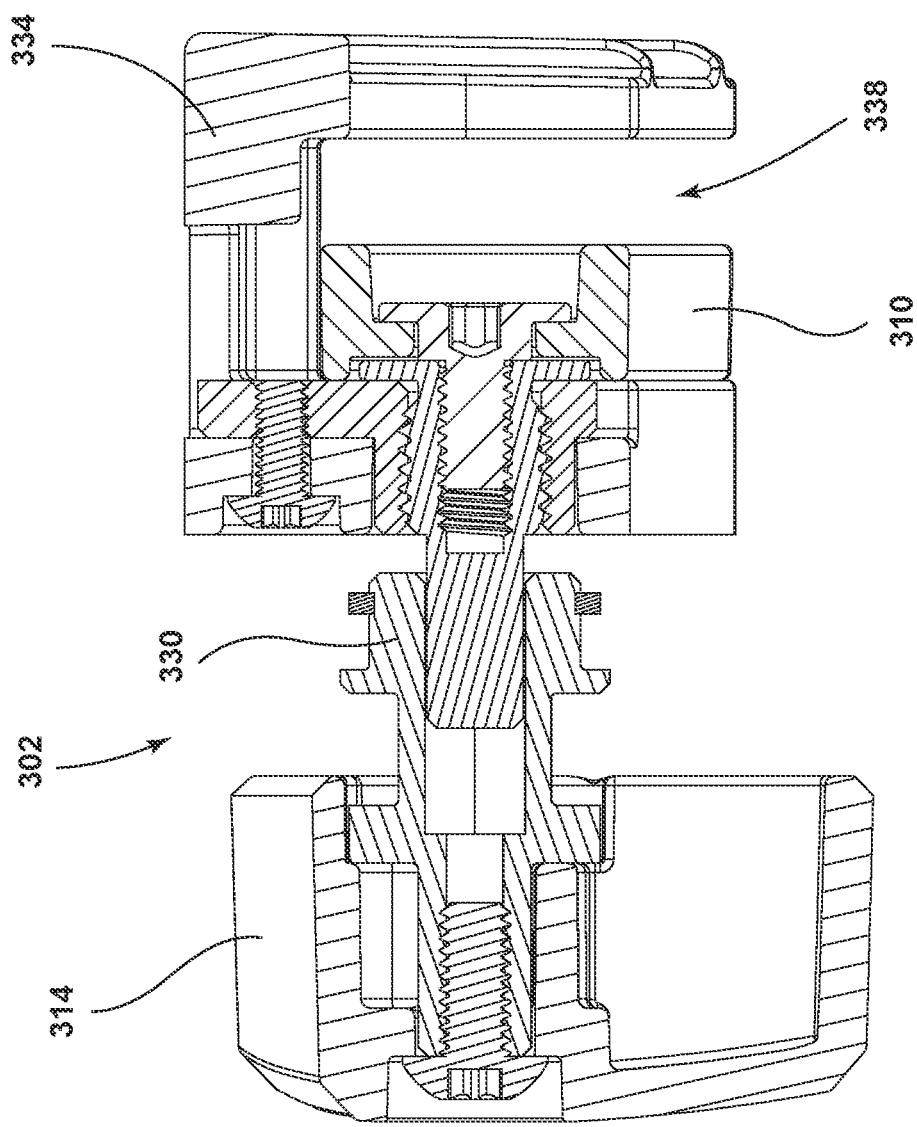
FIG. 21 is a cross-sectional view of the brake assembly of FIG. 20.

FIGS. 19-21 illustrate a brake assembly 302 for selectively limiting the rotational speed of the drum 34 relative to the stand 38. In the illustrated embodiment, the brake assembly 302 is disposed on the center support 70 of the stand 38 behind the back wall 42 of the drum 34. The brake assembly 302 includes a disc 306, a brake pad 310, and an actuator 314. The disc 306 is rotatably fixed relative to the drum 34 such that the disc 306 rotates with the rotation of the drum 34. In the illustrated embodiment, the disc 306 is rotatably fixed relative to the drum 34 by a plurality of interlocking teeth. Specifically, the disc 306 includes a first plurality of teeth 318 extending radially inward. The drum 34 includes a second plurality of teeth 322 extending radially outward from a cap 326 disposed on the back wall 42 of the drum 34. The engagement between the first plurality of teeth 318 and the second plurality of teeth 322 maintain the rotational orientation of the disc 306 relative to the drum 34. In the illustrated embodiment, the first plurality of teeth 318 are evenly spaced around an inner circumference of the disc 306, and the second plurality of teeth 322 are evenly spaced around an outer circumference of the cap 326. However, in other embodiments, the teeth 318, 322 on one or both of the cap 326 and the disc 306 may be unevenly spaced or may not extend around the entire circumference. Likewise, one or both of the cap 326 and the dis may include a greater or fewer number of teeth.

With continued reference to FIGS. 19-21, the brake pad 310 is selectively engagable with the disc 306 to limit rotation of the disc 306, and thereby, limit rotation of the drum 34. The brake pad 310 may selectively exert a frictional force against the disc 306 in order to slow rotation of the drum or bring the drum to a complete stop. The amount of frictional force between the brake pad 310 and the disc 306 determines the degree to which the rotation of the drum is limited. The brake pad 310 is movable relative to the disc 306 by an actuator 314. The actuator 314 is operable to move the brake pad 310 between a first position corresponding to a first frictional force against the disc 306, and a second position corresponding to a second frictional force against the disc 306. The second frictional force is greater than the first frictional force, and therefore, the rotational speed of the drum 34 is slower when the brake pad 310 is in the second position.

In the illustrated embodiment, the actuator 314 is a rotatable knob with a threaded shaft 330. The brake pad 310 is coupled to the end of the shaft 330. The shaft 330 is threadably engaged with a caliper 334. The caliper 334 includes an annular recess 338 that receives the brake pad 310 and the disc 306. In particular, the disc 306 can rotate within the annular recess 338 of the caliper 334. The brake pad 310 is movable towards and away from the disc 306 within the space provided by the recess of the caliper 334. Rotation of the actuator 314 threads the shaft 330 into or out of the caliper 334 to adjust the position of the brake pad 310 within the annular recess 338. Accordingly, rotation of the actuator 314 moves the brake pad 310 towards or away from the disc 306 to either increase or decrease the frictional force between the brake pad 310 and the disc 306. The greater the frictional force between the brake pad 310 and the disc 306, the slower the rotational speed of the drum 34. Therefore, the brake assembly 302 can be used to control the speed of the drum 34 (i.e., slow the speed of the drum to various rotational speeds) or to inhibit the drum 34 from rotating all together.

Figure 22:
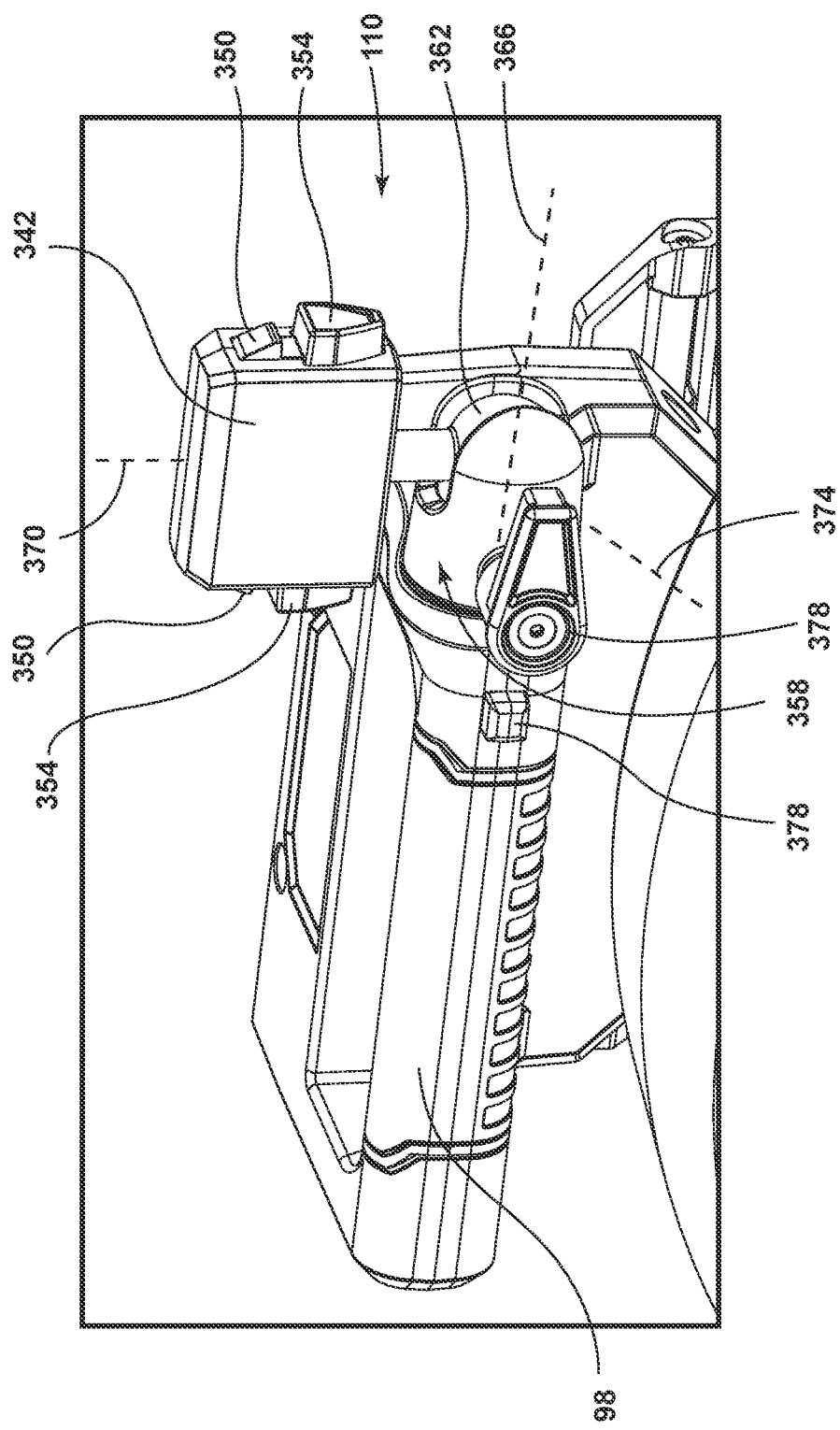
FIG. 22 is a perspective view of a monitor mount.
Figure 23:
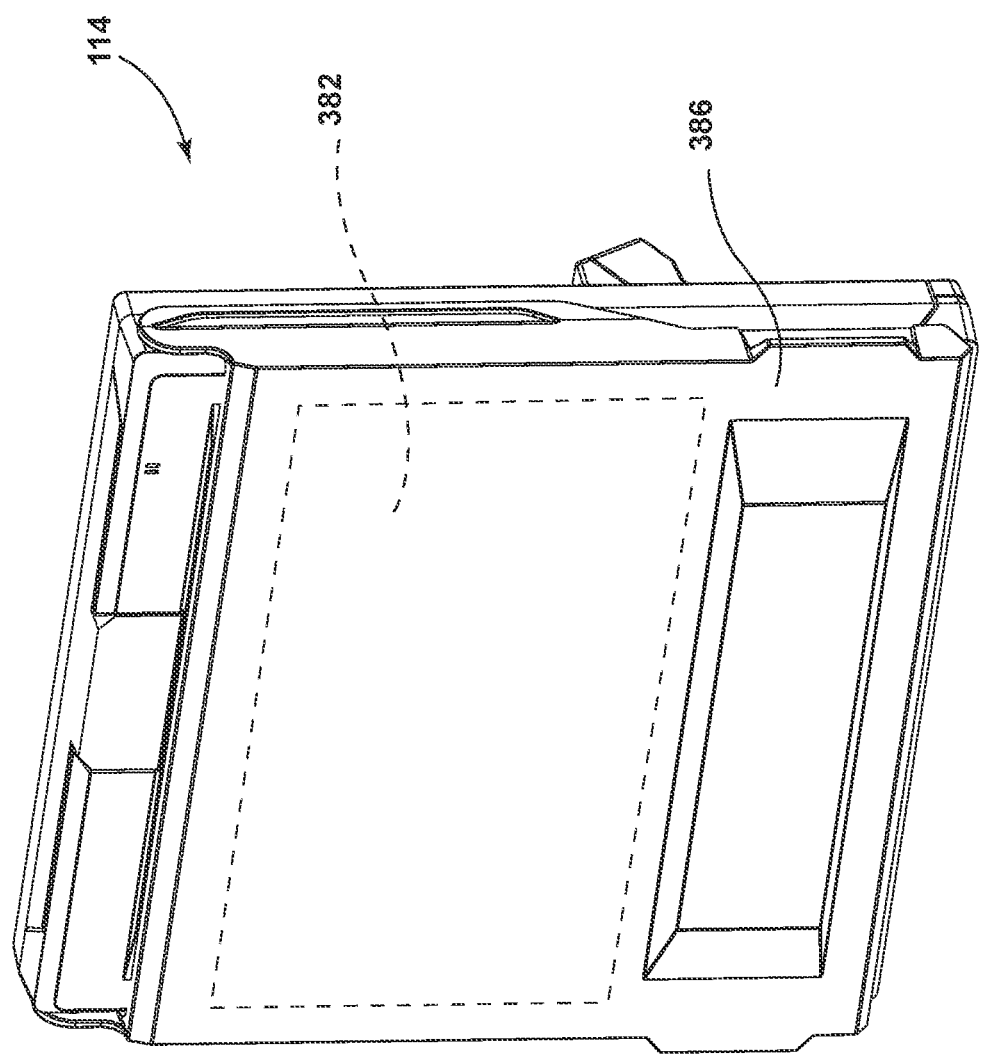
FIG. 23 is a front perspective view of a dedicated monitor for use with a pipeline inspection device.
Figure 24:
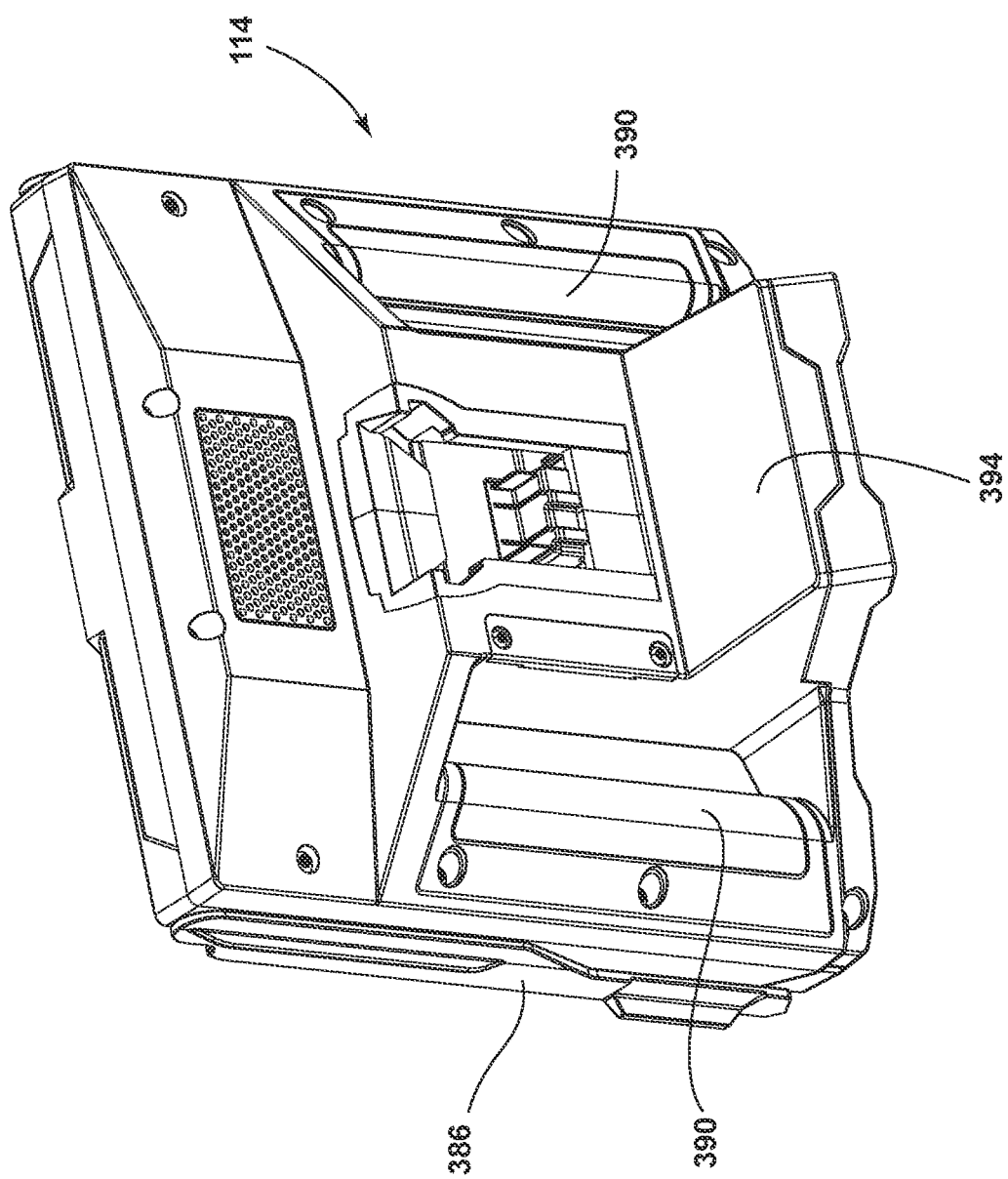
FIG. 24 is a rear perspective view of the dedicated monitor of FIG. 24.
Figure 25:
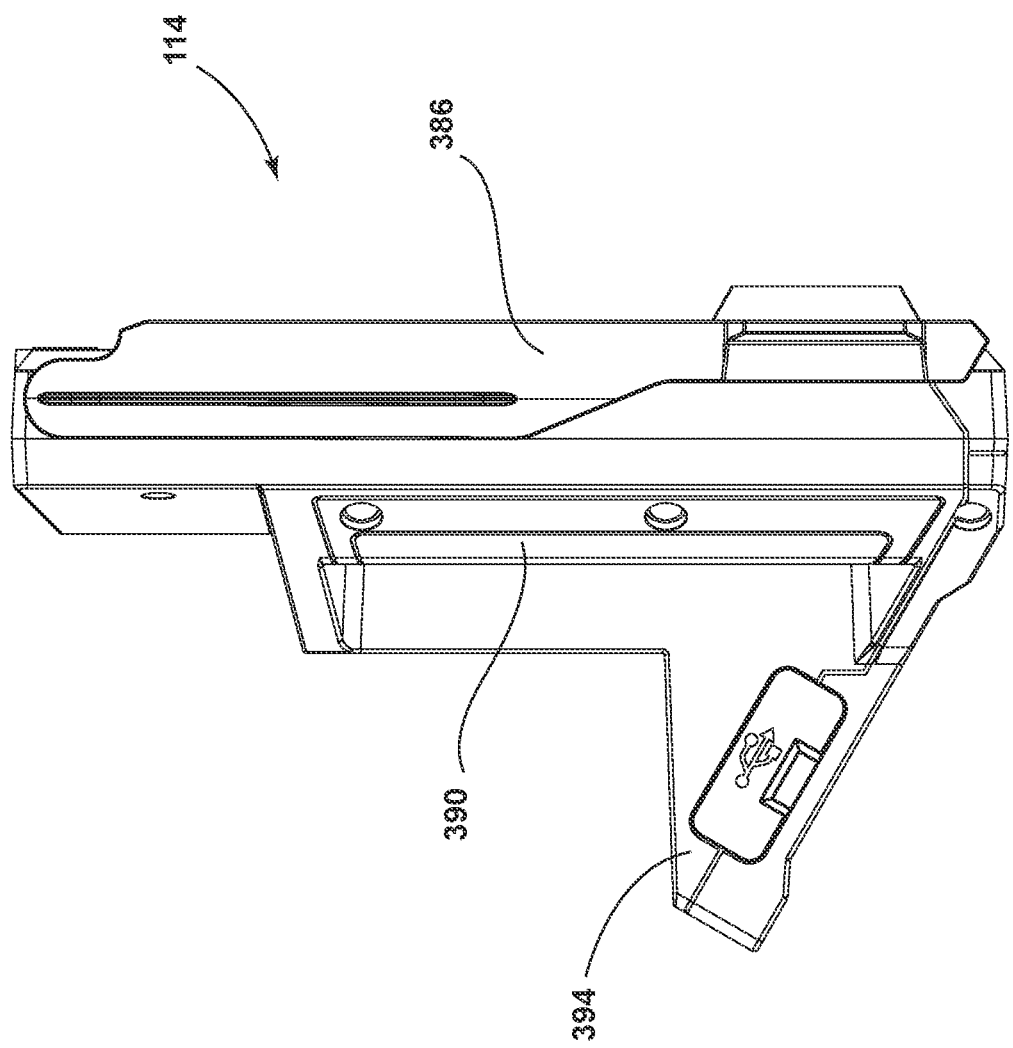
FIG. 25 is a side view of the dedicated monitor of FIG. 24.
Figure 26:
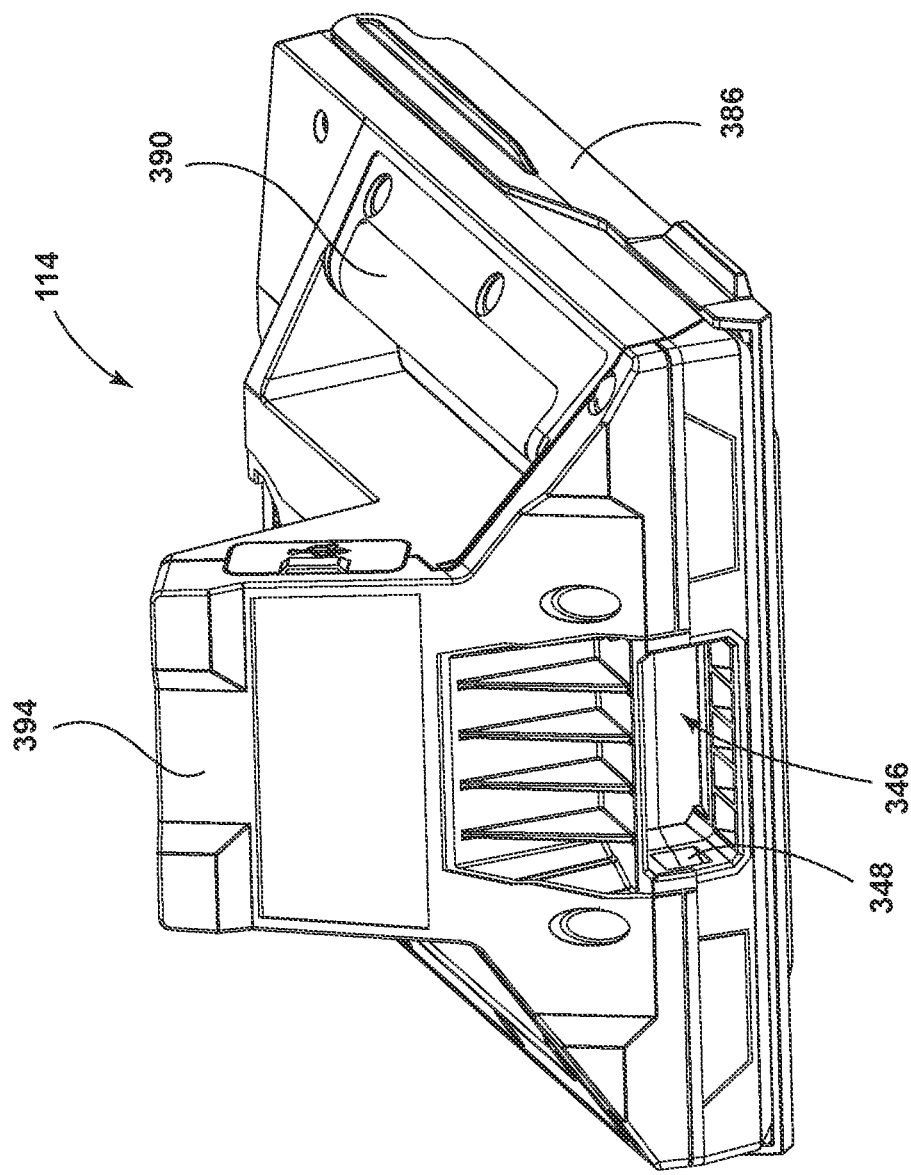
FIG. 26 is a bottom perspective view of the dedicated monitor of FIG. 24.

With reference to FIGS. 22-26, the pipeline inspection device 10 includes a dedicated monitor 114 and a monitor mount 110 for removably coupling the dedicated monitor 114 to the reel 26. FIG. 22 illustrates the monitor mount 110 extending upwards from the center support 70. The monitor mount 110 includes an insert member 342 that can be removably received within a receptacle 346 (FIG. 26) of the dedicated monitor 114. Specifically, the dedicated monitor 114 can be selectively coupled to the monitor mount 110 by sliding the dedicated monitor 114 onto the insert member 342. The insert member 342 has a generally rectangular shape with oppositely facing front and rear faces, top and bottom faces, and side faces. The insert member 342 also includes detent members 350 disposed on the side faces. The detent members 350 are biased away from one another, for example by springs. When the insert member 342 member is received within the receptacle 346, the detent members 350 snap into recesses 348 in the receptacle 346 to hold the dedicated monitor 114 on the monitor mount 110. To release the dedicated monitor 114, a user can squeeze buttons 354 disposed on the side faces of the insert member 342 to overcome the spring bias of the detent members 350 and retract the detent members 350 out of the recesses 348.

The monitor mount 110 rotatably supports the dedicated monitor 114 to provide rotation of the monitor 114. In the illustrated embodiment, the monitor mount 110 enables the dedicated monitor 114 to be rotated about three axis of rotation. Specifically, the monitor mount 110 includes a pivot mount 358 and a ball and socket mount 362. The pivot mount 358 provides rotation of the monitor 114 about a first axis 366. The ball and socket mount 362 provides rotation of the monitor 114 about a second axis 370 and a third axis 374. Furthermore, both the pivot mount 358 and the ball and socket mount 362 include locking members 378 that help maintain the monitor 114 in the desired rotation.

FIGS. 23-26 illustrate various views of the dedicated monitor 114. The dedicated monitor 114 is a monitor 114 that is specifically designed for use with the pipeline inspection device. In other words, the dedicated monitor 114 is a monitor 114 that is not capable of being used as an independent computer or with other devices. Rather, the dedicated monitor 114 is specifically designed to be used only with the pipeline inspection device. The dedicated monitor 114 includes the receptacle 346, which is sized and shaped to receive the insert member 342 of the monitor mount 110. Specifically, the receptacle 346 is positioned on the bottom of the dedicated monitor 114, and has a generally rectangular shape that is complimentary to the size and shape of the insert member 342. The receptacle 346 also includes recesses 348 for engaging with the detent members 350 on the insert member 342. When the dedicated monitor 114 is coupled to the monitor mount 110, the dedicated monitor 114 is supported above the stand 38, and can be rotated to a desired orientation.

The dedicated monitor 114 includes a display screen 382 for showing images (both pictures and videos) captured by the camera 18 and a cover 386 to protect the display screen 382. In the illustrated embodiment, the dedicated monitor 114 also includes features to help make the dedicated monitor 114 more versatile in how it is being used. For example, in addition to being able to couple the dedicated monitor 114 to the monitor mount 110 on the stand 38, the dedicated monitor 114 can be carried around a worksite by a user or rested on other surfaces. Specifically, the dedicated monitor 114 includes a handgrip 390 on the back side of the dedicated monitor 114. In the illustrated embodiment, the dedicated monitor 114 includes two handgrips 390, one on each side, so that the dedicated monitor 114 can be held in either hand. The handgrips 390 are designed to be large enough to be grasped by a user wearing gloves. The dedicated monitor 114 also includes a stand 394 on the back side of the dedicated monitor 114 to support the dedicated monitor 114 on other surfaces around the worksite. The stand 394 extends from a rear of the dedicated monitor 114 at a non-perpendicular angle so that the dedicated monitor 114 is supported on a surface at a comfortable viewing angle.

Figure 27:
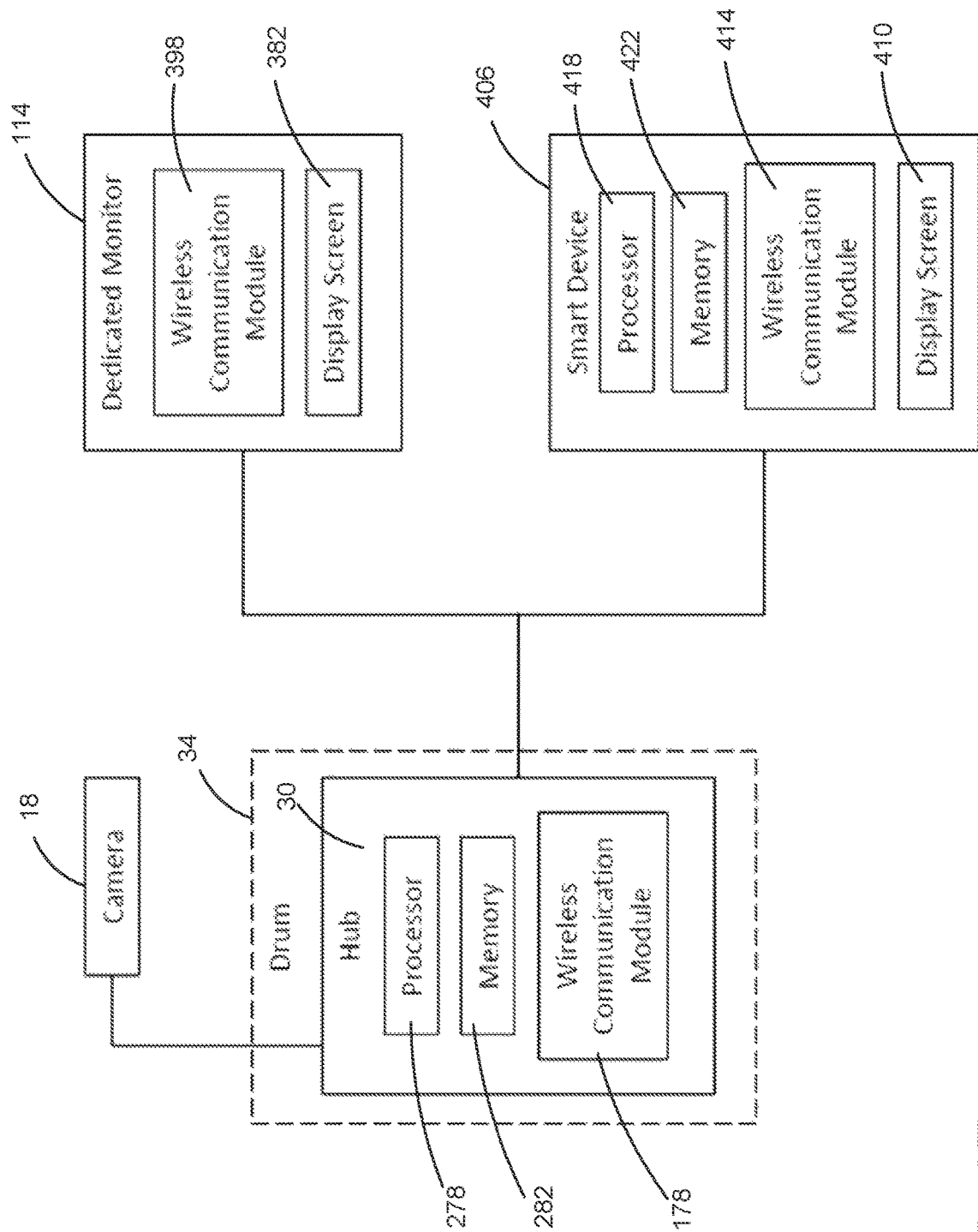
FIG. 27 is a schematic diagram of a hub, a dedicated monitor, and a smart device for use with a pipeline inspection device.
Figure 28:
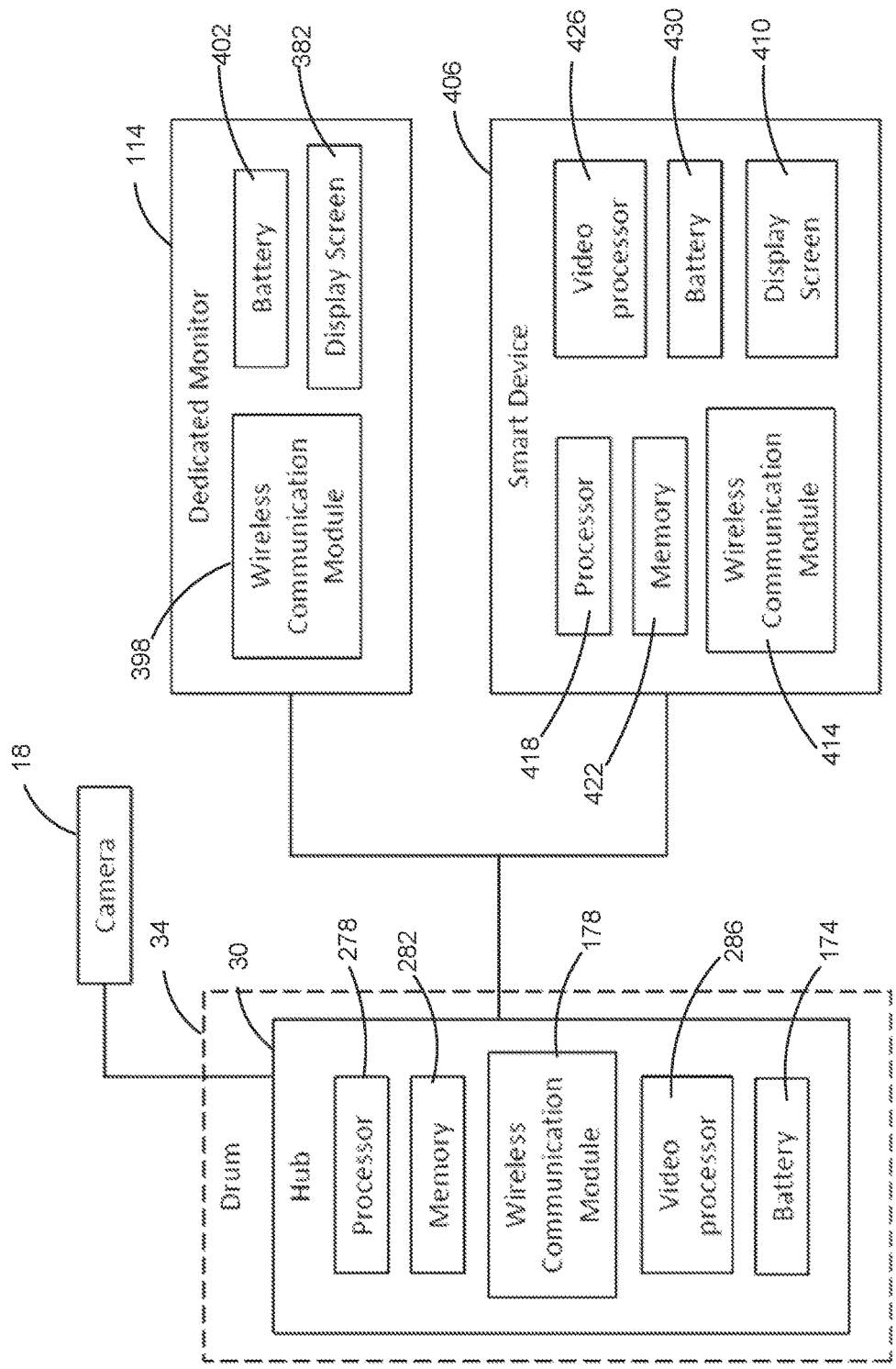
FIG. 28 is another schematic diagram of a hub, a dedicated monitor, and a smart device for use with a pipeline inspection device in accordance with another embodiment.

Referring to FIGS. 27 and 28, the dedicated monitor 114 includes a wireless communication module 398. The dedicated monitor 114 can communicate wirelessly with the hub 30 to receive the images captured by the camera 18. Specifically, the wireless communication module 178 of the hub 30 can be selectively connected to the wireless communication module 398 of the dedicated monitor 114. Accordingly, the dedicated monitor 114 can be operated while coupled to the monitor mount 110 or when removed from the monitor mount 110. In some embodiments, the dedicated monitor 114 may include an onboard battery 402 housed within the dedicated monitor 114. In other embodiments, the dedicated monitor 114 may be powered by the hub 30. For example, the dedicated monitor 114 may be plugged into the hub 30 (directly, or indirectly via the reel 26) to receive power from the battery 174 housed within the hub 30.

The hub 30 can receive images captured by the camera and send them to the dedicated monitor 114 to show on the display screen 382 for an operator to view. Specifically, the hub 30 can receive the images (pictures and video) captured by the camera 18 and can process the images prior to transferring the images to the dedicated monitor 114. For example, the hub 30 can compress the images, rotate images, enhance the images, or conduct other processing before wirelessly transferring the images to the dedicated monitor 114.

The hub 30 can also wirelessly communicate with a smart device 406, such as a smart phone, laptop computer, or tablet computer to display the images captured by the camera 18. The smart device 406 is a different computing device from the dedicated monitor 114, and can be used for other purposes apart from the pipeline inspection device. Specifically, the smart device 406 includes a display screen 410 configured to display the images and a wireless communication module 414 configured to connect to the wireless communication module 178 of the hub 30. The smart device 406 may also include a processor 418, a memory source 422, a video processor 426, and a battery 430. Additionally, the smart device 406 may include an application with a graphical user interface (GUI) configured to display the images captured by the camera 18. The hub 30 can process the images prior to transferring the images to the smart device 406. In addition, the smart device 406 may be able to further process the images via the application.

In some embodiments, the hub 30 may be in wireless communication with both the dedicated monitor 114 and the smart device 406 simultaneously. For example, the images captured by the camera 18 may be simultaneously displayed on the dedicated monitor 114 and the smart device 406. In some embodiments, the hub 30 may only be in wireless communication with one of the dedicated monitor 114 and the smart device 406 at the same time. For example, the hub 30 may be configured to automatically decouple from the dedicated monitor 114 when a wireless connection is made between the hub 30 and the smart device 406. Likewise, the hub 30 may be configured to automatically decouple from the smart device 406 when a wireless connection is made between the hub 30 and the dedicated monitor 114.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Various features and advantages of the invention are set forth in the following claims.

What is claimed is:

1. A pipeline inspection device, comprising:
 a rotatable drum housing a cable, the cable extendable into a pipe;
 a camera positioned on an end of the cable;
 a hub selectively coupled to the drum, the hub including a first mechanical engagement member and a first electrical connection;
 a plurality of electrical components housed within the hub, the plurality of electrical components including a processor and a wireless communication module, the wireless communication module configured to transmit images captured by the camera; and
 a core configured to selectively couple the hub to the drum, the core including a second mechanical engagement member and a second electrical connection, the second mechanical engagement member selectively engageable with the first mechanical engagement member, the second electrical connection selectively engageable with the first electrical connection,
 wherein the hub is removable from the drum and couplable to a second drum, the second drum having a different shape or size from the drum.

2. The pipeline inspection device of claim 1, further comprising a stand rotatably supporting the drum, wherein the core is positioned on the stand.

3. The pipeline inspection device of claim 2, wherein the core is positioned along a rotational axis of the drum.

4. The pipeline inspection device of claim 1, wherein the hub further includes a battery receptacle.

5. The pipeline inspection device of claim 1, wherein the wireless communication module is configured to wirelessly communicate with a dedicated monitor, the dedicated monitor being removably coupled to the drum.

6. The pipeline inspection device of claim 1, wherein the hub includes a rim, and wherein the first mechanical engagement member is an arcuate engagement member positioned at least partially along the rim.

7. A pipeline inspection device, comprising:
 a rotatable drum housing a cable, the cable extendable into a pipe, the drum rotatable about an axis;

a camera positioned on an end of the cable;
a hub selectively coupled to the drum, the hub including a first electrical connection on a first side of the hub and a battery receptacle on a second side of the hub opposite the first side;
a plurality of electrical components housed within the hub, the plurality of electrical components including a processor and a wireless communication module, the wireless communication module configured to wirelessly transmit images capture by the camera; and
a core positioned along the axis of the drum and configured to couple the hub to the drum, the core including a second electrical connection selectively engageable with the first electrical connection;
wherein the hub is removable from the drum and couplable to a second drum, the second drum having a different shape or size from the drum.

8. The pipeline inspection device of claim 7, further comprising a stand rotatably supporting the drum, wherein the core is positioned on the stand.

9. The pipeline inspection device of claim 7, wherein the hub further includes a first mechanical engagement member and the core includes a second mechanical engagement member, the second mechanical engagement member selectively engageable with the first mechanical engagement member to couple the hub to the drum.

10. The pipeline inspection device of claim 9, wherein the hub includes a rim, and wherein the first mechanical engagement member is an arcuate engagement member positioned at least partially along the rim.

11. The pipeline inspection device of claim 7, wherein the wireless communication module is configured to wirelessly communicate with a dedicated monitor, wherein the hub is powered by a first battery and the dedicated monitor is powered by a second battery.

12. A pipeline inspection device, comprising:
a reel including a rotatable drum and a stand rotatably supporting the drum;
a cable housed within the drum, the cable extendable into a pipe;
a camera positioned on an end of the cable;
a hub selectively coupled to the reel, the hub including
    a first mechanical engagement member selectively engageable with a second mechanical engagement member of the reel to couple the hub to the reel,
    a first electrical connection selectively engageable with a second electrical connection of the reel when the hub is coupled to the reel, and
    a battery receptacle positioned on a side of the hub opposite the first electrical connection, the battery receptacle configured to removably receive a battery; and
a plurality of electrical components housed within the hub, the plurality of electrical components including a processor and a wireless communication module, the wireless communication module configured to transmit images capture by the camera;
wherein the hub is removable from the reel and couplable to a second reel, the second reel being having a different shape or size from the reel.

13. The pipeline inspection device of claim 12, wherein the hub is coupled to the reel by the stand.

14. The pipeline inspection device of claim 12, wherein the hub is coupled to the reel by the drum.

15. The pipeline inspection device of claim 14, wherein the hub is coupled to the reel along a rotational axis of the drum.

16. The pipeline inspection device of claim 12, wherein the wireless communication module is configured to wirelessly communicate with a dedicated monitor, wherein the hub and the dedicated monitor are powered by the same battery.

17. The pipeline inspection device of claim 12, wherein the hub includes a rim, and wherein the first mechanical engagement member is an arcuate engagement member positioned at least partially along the rim.

* * * * *